(12) United States Patent
Akinwande et al.

(10) Patent No.: US 10,319,554 B2
(45) Date of Patent: Jun. 11, 2019

(54) COMPACT MODULAR CATHODE

(71) Applicant: Massachusetts Institute of Technology, Cambridge, MA (US)

(72) Inventors: Akintunde I. Akinwande, Newton, MA (US); Stephen Angelo Guerrera, Waitsfield, VT (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/539,384

(22) PCT Filed: Dec. 23, 2015

(86) PCT No.: PCT/US2015/000477
§ 371 (c)(1),
(2) Date: Jun. 23, 2017

(87) PCT Pub. No.: WO2016/105573
PCT Pub. Date: Jun. 30, 2016

(65) Prior Publication Data
US 2017/0365438 A1   Dec. 21, 2017

Related U.S. Application Data

(60) Provisional application No. 62/096,654, filed on Dec. 24, 2014.

(51) Int. Cl.
*H01J 29/86*   (2006.01)
*H01L 29/06*   (2006.01)
(Continued)

(52) U.S. Cl.
CPC ............. *H01J 29/86* (2013.01); *G01L 21/34* (2013.01); *H01J 1/3042* (2013.01); *H01J 3/022* (2013.01);
(Continued)

(58) Field of Classification Search
CPC .......... H01J 29/86; H01J 29/481; H01J 1/304; H01J 1/308; H01J 2201/3048; H01J 2201/308; H01J 2329/02
See application file for complete search history.

(56) References Cited

U.S. PATENT DOCUMENTS 3,309,616 A    3/1967   Thompson, Jr.
5,909,032 A *  6/1999   Wakalopulos .......... B29C 71/04
                                                      250/492.3
(Continued)

FOREIGN PATENT DOCUMENTS

WO   WO 2014/124041 A2   8/2014

OTHER PUBLICATIONS

Krimmel et. al. "Si Silicon: Silicon Nitride in Microelectronics and Solar Cells" Gmelin Handbook of Inorganic and Organometallic Chemistry, 8th Edition, Springer Verlag GmbH, 1991, ISBN 978-3-662-09903-2.*

(Continued)

*Primary Examiner* — Sitaramarao S Yechuri
(74) *Attorney, Agent, or Firm* — Wolf, Greenfield & Sacks, P.C.

(57) ABSTRACT

Example compact modular electron beam units are provided that can be used to generate electron beams using field emitter elements. A modular electron beam unit may comprise an electron beam source including a base portion, at least one field emitter element coupled to the base portion, the field emitter element including a field emitter tip, at least one gate electrode and a membrane window disposed over the at least one gate electrode.

20 Claims, 25 Drawing Sheets

(51) Int. Cl.

| | | |
|---|---|---|
| H01L 29/12 | (2006.01) | |
| G01L 21/34 | (2006.01) | |
| H01J 29/48 | (2006.01) | |
| H01J 29/56 | (2006.01) | |
| H01J 29/62 | (2006.01) | |
| H01J 1/304 | (2006.01) | |
| H01J 3/02 | (2006.01) | |

(52) U.S. Cl.
CPC .......... *H01J 29/481* (2013.01); *H01J 29/566* (2013.01); *H01J 29/62* (2013.01); *H01J 2229/4817* (2013.01); *H01J 2229/5635* (2013.01)

(56) References Cited

U.S. PATENT DOCUMENTS

| | | | |
|---|---|---|---|
| 2004/0061051 | A1 | 4/2004 | Schneiker et al. |
| 2004/0067602 | A1 | 4/2004 | Jin |
| 2007/0114434 | A1* | 5/2007 | Chang ............... G21K 5/04 250/400 |
| 2009/0046823 | A1 | 2/2009 | Edwards et al. |
| 2010/0065754 | A1 | 3/2010 | Bromberg et al. |
| 2013/0146221 | A1* | 6/2013 | Kolmakov .......... B32B 38/0004 156/252 |
| 2014/0184074 | A1 | 7/2014 | Perkins |
| 2014/0209820 | A1 | 7/2014 | Barry et al. |
| 2015/0380539 | A1* | 12/2015 | Colinge ............... H01L 29/775 257/9 |

OTHER PUBLICATIONS

International Search Report and Written Opinion for Application No. PCT/US2015/00468 dated Mar. 4, 2016.
International Search Report and Written Opinion for Application No. PCT/US2015/00477 dated Mar. 11, 2016.
International Preliminary Report on Patentability for Application No. PCT/US2015/00468 dated Jul. 6, 2017.
International Preliminary Report on Patentability for Application No. PCT/US2015/00477 dated Jul. 6, 2017.
Bhattacharyya et al., Deep Ultraviolet emitting AlGaN quantum wells with high internal quantum efficiency. Applied Physics Letters. 2009;94:181907-1-3.
Carazzetti et al., Experimental study of electrical breakdown in MEMS devices with micrometer scale gaps. Reliability, Packaging, Testing, and Characterization of MEMS/MOEMS VII, Proc of SPIE. 2008. vol. 6884. 12pages.
Chen et al., A micro ionizer for portable mass spectrometers using double-gated isolated vertically aligned carbon nanofiber arrays. IEEE International Electron Devices Meeting—IEDM. 2007;843-6.
Chen et al., A Microionizer for Portable Mass Spectrometers Using Double-Gated Isolated Vertically Aligned Carbon Nanofiber Arrays. IEEE Trans on Electron Devices. Jul. 2011;58(7):2149-58.
Chen et al., Aperture-collimated double-gated silicon field emitter arrays. IEEE Tranactions on Electron Devices. Mar. 2007;54(3):601-8.
Cheung et al., Chip-scale Quadrupole Mass Filters for Portable Mass Spectrometry. Journal of Microelectromechanical Systems. Jun. 2010;19(3):469-83.
Chichibu et al., Origin of defect-insensitive emission probability in In-containing (Al,In,Ga)N alloy semiconductors. Nature Materials. Oct. 2006;5:810-6.
Chuang., Optical gain of strained wurtzite GaN quantum-well lasers. IEEE Journal of Quantum Electronics. Oct. 1996;32(10):1791-1800.
Ding et al., Highly uniform and low turn-on voltage Si field emitter arrays fabricated using chemical mechanical polishing. IEEE Electron Device Letters. Feb. 2000;21(2):66-9.
Ding et al., Silicon Field Emission Arrays with Atomically Sharp Tips: Turn-on Voltage and the Effect of Tip Radius Distribution. IEEE Transactions on Electron Devices. Dec. 2002;49(12):2333-42.
Dogan et al., Dense array slab-coupled optical waveguide laser capable of 500W/bar. Proceedings of SPIE. 2014; 8965: 89650L-1-7.
Dougal et al., High Performance Micropane Electron Beam Window. Journal of Vacuum Science & Technology B. Nov./Dec. 2000;18(6):2750-6.
Dvorson et al., Electrical and optical characterization of field emitter tips with integrated vertically stacked focus. IEEE Transactions on Electron Devices. Dec. 2003;50(12):2548-58.
Fan et al., Improve power conversion efficiency of slab coupled optical waveguide lasers. Optics Express. Jul. 2014;22(15):17666-72.
Fomani et al., Challenges of High Vacuum Pumping based on Impact Ionization and Ion Implantation Process. Tech Digest of the 27th International Vacuum Nanoelectronics Conference. Jul. 2014. 2pages.
Fomani et al., Low-Voltage Field Ionization of Gases Up to Torr-Level Pressures Using Massive Arrays of Self-Aligned Gated Nanoscale Tips. IEEE Trans on Electron Devices. May 2014;61(5):1520-8.
Fomani et al., Toward Amp-Level Field Emission with Large-Area Arrays of Pt-Coated Self-Aligned Gated Nanoscale Tips. IEEE Transactions on Electron Devices. Jul. 2014;61(7):2538-46.
Gassend et al., A microfabricated planar electrospray array ionic liquid ion source with integrated extractor. Journal of Microelectromechanical Systems. Jun. 2009;18(3):679-94.
Gassend et al., Precision in-plane hand assembly of bulk-microfabricated components for high-voltage MEMS arrays applications. Journal of Microelectromechanical Systems. Apr. 2008;18(2):332-46.
Guerrera et al., Improved Field Emitter Arrays with Integrated Vertical Curent Limiters and Self-Aligned Gate Apertures. Tech Digest of 2014 27th International Vacuum Nano Conf, INVC. Jul. 2014. 2pages.
Guerrera et al., Scaling of high-aspect-ratio current limiters for the individual ballasting of large arrays of field emitters. IEEE Transactions on Electron Devices. Sep. 2012;59(9):2524-30.
Guerrera et al., Self-aligned, gated field emitter arrays with integrated high-aspect-ratio current limiters. 2013 26th International Vacuum Nanoelectronics Conf, IVNC. Jul. 2013. 2pages.
Hoke et al, Thermodynamic analysis of cation incorporation during molecular beam epitaxy of nitride films using metal-rich growth conditions. Journal of Vacuum Science and Technology B. May/Jun. 2007;25(3):978-82.
Iliopoulos et al., Growth kinetics of AlGaN films by plasma-assisted molecular-beam epitaxy. Applied Physics Letters. Jul. 2002;81(2):295-7.
Jacob, Penetration and energy deposition of electrons in thick targets. Journal of Applied Physics. Jan. 1974;45(1):467-75.
Johnson et al., Field ionization characteristics of an ion source array for neutron generators. Journal of Applied Physics. 2013;114:174906-1-9.
Johnson, A Microfabricated Deuterium Ion Source for Compact Neutron Generators. Dissertation submitted to the University of New Mexico. May 2013. 216 pages.
Lochner et al., Deep-ultraviolet lasing at 243 nm from photopumped AlGaN/AlN heterostructure on AlN substrate. Applied Physics Letters. 2013;102:101110-1-4.
Matsumoto et al., Handheld deep ultraviolet emission device based on aluminum nitride quantum wells and graphene nanoneedle field emitters. Optics Express. Oct. 2012; 20(22):24320-9.
Moustakas et al., Experimental Evidence that the Plasma-assisted MBE Growth of Nitride Alloys is a Liquid Phase Epitaxy Process. ECS Transactions. 2011;35(6):63-71.
Moustakas et al., The role of liquid phase epitaxy during growth of AlGaN by MBE. Phys Status Solidi C. 2012;9(3-4):580-3.
Moustakas., The role of extended defects on the performance of optoelectronic devices in nitride semiconductors. Physica Status Solidi A. 2013;210(1):169-74.

(56) References Cited

OTHER PUBLICATIONS

Nguyen et al., AirSEM: Electron Microscopy in Air, without a Speciman Chamber. Microscopy and Microanalysis. 2013;19(Suppl 2):428-9. doi:10.1017/S1431927613004133.

Nikiforov et al., Evidence of deep ultraviolet amplified spontaneous emission in electron beam pumped AlGaN multiple-quantum-well-based structures. Lester Eastman Conference on High Performance Devices (LEC). 2012. 4pages. DOI: 10.1109/lec.2012.6410975.

Nishiyama et al., Atmospheric scanning electron microscope observes cells and tissues in open medium through silicon nitride film. Journal of Structural Biology. 2010;169:438-49.

Nix et al., Crystallite coalescence: A mechanism for intrinsic tensile stresses in thin films. Journal of Materials Research. Aug. 1999;14(8):3467-73.

Oto et al., 100 mW deep-ultraviolet emission from aluminum-nitride-based quantum wells pumped by an electron beam. Nature Photonics. Nov. 2010;4:767-70.

Pearsall, GaInAsP Alloy Semiconductors. Wiley. 1982;47.

Pecora et al., Polarization properties of deep-Ultraviolet optical gain in Al-rich AlGaN structures. Applied Physics Express. 2012;5:032103-1-3.

Pecora et al., Sub-250 nm light emission and optical gain in AlGaN materials. Journal of Applied Physics. 2013;113:0133106-1-7.

Pecora et al., Sub-250nm Room-Temperature Optical Gain from AlGaN/AlN Multiple Quantum Wells with Strong Band-Structure Potential Fluctuations. Applied Physics Letters. 2012;100:061111-1-4.

Persaud et al., A compact neutron generator using a filed ionization sources. Review of Scientific Instruments. 2012;83:02B312-1-4.

Pflug et al., Field Emitter Arrays for Low Voltage Applications with sub 100 nm apertures and 200 nm period. Tech Digest of the IEEE International Electron Device Meeting. Dec. 2001. 4 pages.

Reichenbach et al., The field evaporation of deuterated titanium as neutron generator ion source. Journal of Applied Physics. 2010;108:094903-1-9.

Reijonen et al., rf ion source development for neutron generation and for material modificiation. Review of Scientific Instruments. Feb. 2002;73(2):934-6.

Riley et al., Helium detection via field ionization from carbon nanotubes. Nano Letters. 2003;3(10):1455-8.

Rokni et al., Dominant formation and quenching processes in E-beam pumped ArF* and KrF* lasers. Physical Review A. Dec. 1977;16(6). 10 pages.

Southon et al., Current-voltage Characteristics of Helium Field-ion Microscope. Philosophical Magazine: A Journal of Theoretical Experimental and Applied Physics. 1963;579-91.

Spindt et al., Physical properties of thinfilm field emission cathods with molybdenum cones. Journal of Applied Physics. Dec. 1976:47(12):5248-63.

Suga et al., The Atmospheric Scanning Electron Microscope with open sample space observes dynamic phenomena in liquid or gas. Ultramicroscopy. 2011;111:1650-8.

Sun et al., Development of AlGaN-based graded-index-separate-confinement-heterostructure deep UV emitters by molecular beam epitaxy. Journal of Vacuum Science & Technology B. May/Jun. 2013;31(3):03C117-1-7.

Takano et al., Room-temperature deep-ultraviolet lasing at 241.5 nm of AlGaN multiple-quantum-well laser. Applied Physics Letters. May 2004;84(18):3567-9.

Tiberi et al., Electron beam pumped lasers based on II-VI compound nanostructures. Phys Status Solidi B. 2010;247(6):1547-52.

Tsujino et al., Nanosecond pulsed field emission form-gate metallic field emitter arrays fabricated by molding. Journal of Vacuum Science and Technology B. Mar/Apr. 2011;29(2):02B117-1-7.

Velasquez-Garcia et al., CNT-Based MEMS/NEMS Gas Ionizers for Portable Mass Spectrometry Applications. Journal of MicroElectroMechanical Systems. Jun. 2010;19(3):484-93.

Velasquez-Garcia et al., CNT-based gas ionizers with integrated Mems gate for portable mass spectrometry applications. 15th International Conference on Solid-State Sensors, Actuators and Microsystem Transducers. Jun. 21-25, 2009. 4 pages.

Velasquez-Garcia et al., Uniform High Current Field Emission of Electrons from Si and Cnf FEAs individually controlled by Si Pillar Ungated FETs. IEEE International Electron Device Meeting Technical Digest. 2007; 599-602.

Velasquez-Garcia et al., Uniform High-Current Cathodes Using Massive Arrays of Si Field Emitters Individually Controlled by Vertical Si Ungated FETs—Part 1: Device Design and Simulation. IEEE Transactions on Electron Devices. Jun. 2011;58(6):1775-82.

Velasquez-Garcia et al., Uniform High-Current Cathodes Using Massive Arrays of Si Field Emitters Individually Controlled by Vertical Si Ungated FETs—Part 2: Device Fabrication and Characterization. IEEE Transactions on Electron Devices. Jun. 2011;58(6):1783-91.

Venus et al., High-brightness narrow-line laser diode source with vol. Bragg-grating feedback. Proceedings of SPIE 5711, High-Power Diode Laser Technology and Applications III. Mar. 2005;5711:166-76.

Wu, Development of a Compact Neutron Generator to be Used for Associated Particle Imaging Utilizing a Rf-Driven Ion Source. UC Berkeley Electronic Theses and Dissertations. 2009. 126pages.

Wunderer et al., Optically pumped UV lasers grown on bulk AlN substrates. Physica Status Solidi C. 2012;9(3-4):822-5.

Wunderer et al., Pseudomorphically Grown Ultraviolet C Photopumped Lasers on Bulk Ain Substrates. Applied Physics Express. 2011;4:092101-1-3.

Zhang et al., Molecular beam epitaxy growth of AlGaN quantum wells on 6H-SiC substrates with high internal quantum efficiency. Journal of Vacuum Science and Technology B. May/Apr. 2012;30(2):02B119-1-5.

\* cited by examiner

COMPACT MODULAR CATHODE

CROSS-REFERENCE TO RELATED APPLICATION

This application is a National Stage Application under 35 U.S.C. § 371 of International Application Serial No. PCT/US2015/000477, filed Dec. 23, 2015, entitled "Compact Modular Cathode," which claims a priority benefit to U.S. Provisional Application No. 62/096,654, filed on Dec. 24, 2014, entitled "Modular Cathode For Micro Electron Beam Pumped Deep UV Laser," each of which is hereby incorporated by reference in its entirety for all purposes.

BACKGROUND

Field emitter arrays (FEAs) are versatile cold cathodes. However, they have not found widespread adoption in demanding device applications due to, among other things, the sensitivity of field-emitted currents to emitter tip radii spread (spatial non-uniformity) and to fluctuation of the work function (caused by gas adsorption and desorption at the tip surface (temporal non-uniformity)). Other issues include tip damage or burn-out from Joule heating due to micro-plasma explosion.

SUMMARY

In view of the foregoing, according to the systems, methods, apparatus described herein, compact modular cathode units are provided, that are formed with arrays of field emitter elements. Any example field emitter array herein can be implemented to dynamically write patterns, thereby reducing the complexity and chance for failure.

Example systems, methods, and apparatus herein provide a modular electron beam unit that includes an electron beam source and a membrane window. The example electron beam source includes a base portion, and at least one field emitter element coupled to the base portion such that a first end of the at least one field emitter element is proximate to the base portion and a field emitter tip disposed proximate to the second end. At least one gate electrode is disposed proximate to the second end of the at least one field emitter element, to apply a potential difference proximate to the field emitter tip of the at least one field emitter elements, thereby extracting electrons (via tunneling) from the at least one field emitter tip to form an electron beam. The membrane window is disposed over the at least one gate electrode. The membrane window is formed of a material that is selectively transmissive to electrons but impermeable to gas molecules, and the membrane window is coupled to the at least one gate electrode such that the modular electron beam unit has low permeability to oxidizing gaseous molecules.

Example systems, methods, and apparatus herein provide a modular electron beam unit that includes a modular housing unit that is selectively impermeable to gas molecules including oxidizing gaseous molecules. The modular housing unit includes a base portion, a membrane window that is selectively transmissive to electrons and impermeable to gas molecules, and an electron beam source. The electron beam source includes at least one field emitter element coupled to the base portion such that a first end of the at least one field emitter element is proximate to the base portion and a field emitter tip disposed proximate to the second end. At least one gate electrode is disposed proximate to the second end of the at least one field emitter element, to apply a potential difference proximate to the field emitter tip of the at least one field emitter elements, thereby extracting electrons (via tunneling) from the at least one field emitter tip to form an electron beam. The modular housing unit also includes at least one anode component that is configured to accelerate the electron beam in a path directed at the membrane window of the modular housing unit.

Example systems, methods, and apparatus herein provide a modular electron beam unit that includes a modular housing unit that is selectively impermeable to gas molecules including oxidizing gaseous molecules. The modular housing unit includes a base portion, a membrane window that is selectively transmissive to electrons and impermeable to gas molecules, and an electron beam source. The electron beam source includes a plurality of field emitter elements disposed over the base portion in at least one array. Each field emitter element of the plurality of field emitter elements has a first end that is proximate to the base portion and a field emitter tip disposed proximate to the second end. At least one gate electrode is disposed proximate to the second end of the at least one field emitter element, to apply a potential difference proximate to the field emitter tip of the at least one field emitter elements, thereby extracting electrons (via tunneling) from the at least one field emitter tip in a direction away from the at least one field emitter tip. The modular housing unit also includes at least one electrostatic electrode configured to direct the electrons in an emission path that crosses at least a portion of the membrane window of the modular housing unit, thereby forming an electron beam.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
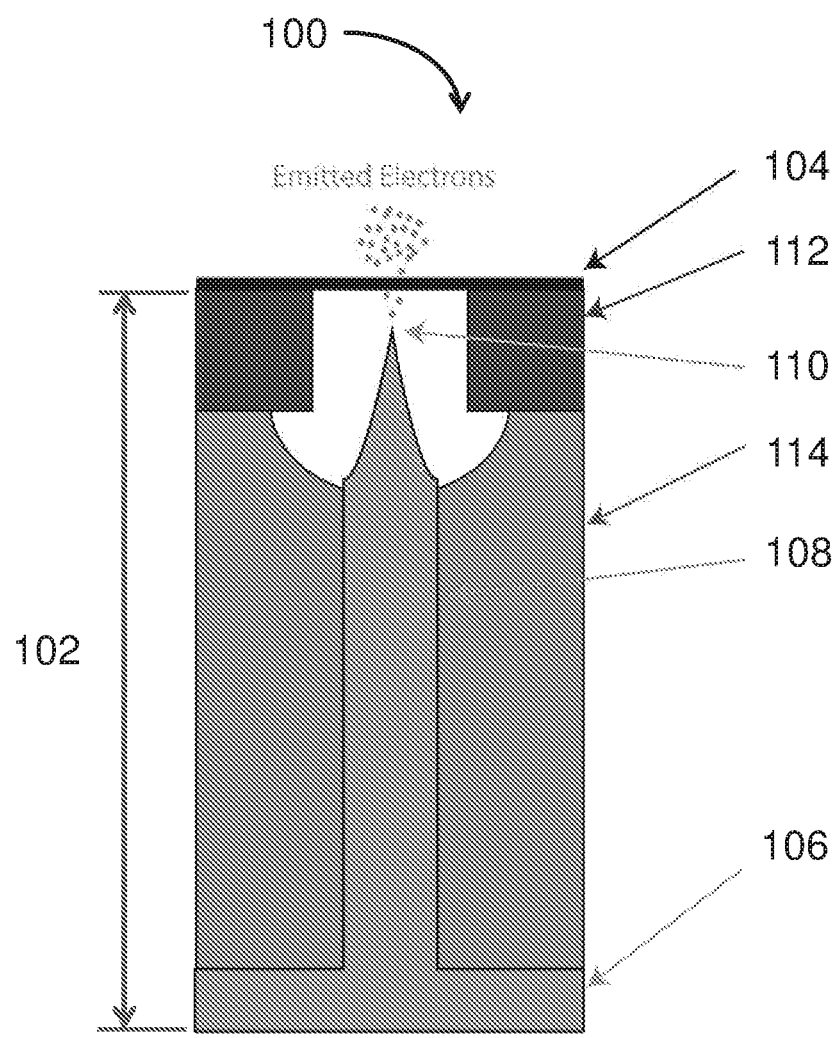
FIG. 1 shows a cross-sectional view of an example modular electron beam unit, according the principles herein.

The features and advantages of the present invention will become more apparent from the detailed description set forth below when taken in conjunction with the drawings.

DETAILED DESCRIPTION

Following below are more detailed descriptions of various concepts related to, and embodiments of, inventive systems, methods and apparatus for providing example modular electron beam unit including field emitters, including field emitters formed arrays. It should be appreciated that various concepts introduced above and described in greater detail below may be implemented in any of numerous ways, as the disclosed concepts are not limited to any particular manner of implementation. Examples of specific implementations and applications are provided primarily for illustrative purposes.

It also should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

As used herein, the term "includes" means includes but is not limited to, the term "including" means including but not limited to. The term "based on" means based at least in part on.

With respect to base portions, substrates or other surfaces described herein in connection with various examples of the principles herein, any references to "top" surface and "bottom" surface are used primarily to indicate relative position, alignment and/or orientation of various elements/components with respect to the substrate and each other, and these terms do not necessarily indicate any particular frame of reference (e.g., a gravitational frame of reference). Thus, reference to a "bottom" of a substrate or a layer does not necessarily require that the indicated surface or layer be facing a ground surface. Similarly, terms such as "over," "under," "above," "beneath" and the like do not necessarily indicate any particular frame of reference, such as a gravitational frame of reference, but rather are used primarily to indicate relative position, alignment and/or orientation of various elements/components with respect to the substrate (or other surface) and each other. The terms "disposed on" and "disposed over" encompass the meaning of "embedded in," including "partially embedded in." In addition, reference to feature A being "disposed on," "disposed between," or "disposed over" feature B encompasses examples where feature A is in contact with feature B, as well as examples where other layers and/or other components are positioned between feature A and feature B.

Example systems, methods, and apparatus herein provide modular electron beam units that exhibit high current density and long life, are reliable and capable of operating in a poor vacuum environment. They can be used in a new generation of vacuum electronic devices that are compact, energy efficient and are capable of delivering significant power at high frequency.

Example modular electron beam units herein based on field emitter arrays can be used as potential high current density electron sources. The example systems, methods and apparatus herein provide spatial and temporal control of the emissions.

Example systems, methods, and apparatus herein provide modular electron beam units that can be used to generate electron beams using field emitter elements or field emitter arrays.

The example modular electron beam unit exhibit increased lifetime and performance by introducing features that act to focus the electron beam and protect the field emitter tips from degradation.

The instant disclosure describes example systems, methods, and apparatus for fabrication of self-aligned double gate high aspect ratio field emitter tip structures, reduction of emitter tip damage from degradation, and reduction of the likelihood of premature dielectric breakdown due to high voltage operation.

An example modular electron beam unit herein can be configured to have a modular cathode architecture in which electron emission and acceleration can occur in high vacuum, while the deposition of the energy can occur at ambient pressure in relevant device structure, such as but not limited to a laser gain medium. The electrons of the electron beam pass through a membrane window that is transparent to electrons but impermeable to ambient gas molecules. The compact modular cathode architecture allows the electron beam source (and other components such as but not limited to an accelerator) to be fully enclosed in a high vacuum package, while the deposition of the energy gained by the electrons occurs at ambient. The accelerated electrons pass through a thin membrane window that is transparent to the energetic electrons but impermeable to ambient gas molecules. Electrons are emitted from micro-fabricated cathodes based on field emitter arrays, collimated by an integrated focus electrode and accelerated by electrodes enclosed in the vacuum package up to 10 keV to the exit window made from the thin membrane.

In a non-limiting example of an electron beam pumped laser application, the semiconductor gain layer can be directly attached to the energetic electron source (i.e., the modular electron beam unit). As a result, the electrons experience scattering only from the thin membrane window before entering the semiconductor gain layer.

FIG. 1 shows a cross-sectional view of an example modular electron beam unit 100 according the principles taught herein. The example modular electron beam unit 100 includes an electron beam source 102 and a membrane window 104. The electron beam source 102 includes a base portion 106 and a field emitter element 108 coupled to the base portion 106. One end of the field emitter element 108 is proximate to the base portion 106, and the opposite end is formed as a field emitter tip 110. A gate electrode 112 is positioned relative to the second end of the at least one field emitter element, to apply a potential difference relative to the field emitter tip 110 to extract electrons (via tunneling) from the field emitter tip 110 to form an electron beam. The membrane window 104 is disposed over the gate electrode 112 such that at least a portion of the membrane window 104 is in physical communication with the gate electrode. The membrane window is formed from a material that is selectively transmissive to electrons while remaining impermeable to gas molecules. In addition, the membrane window 104 is coupled to the gate electrode 112 such that the modular electron beam unit has low permeability to gas molecules, including oxidizing gaseous molecules, which can degrade the performance of the field emitter.

In a non-limiting example, the modular electron beam unit 100 can include an electrically insulating dielectric material 114 having low permeability to oxidizing gaseous molecules that surrounds at least a portion of the field emitter element 108 to serve as a modular housing unit.

Figure 2:
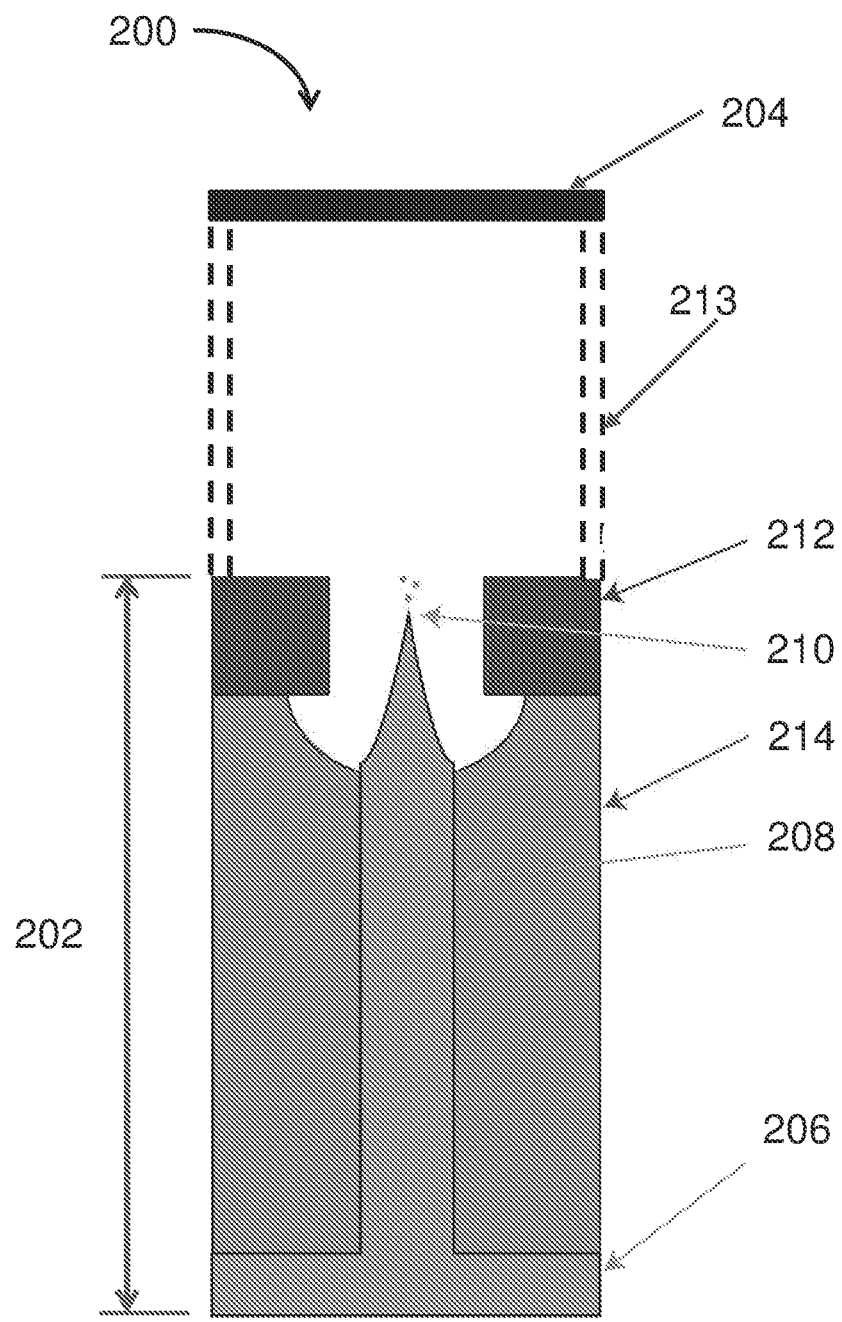
FIG. 2 shows a cross-sectional view of another example modular electron beam unit, according the principles herein.

FIG. 2 shows a cross-sectional view of another example modular electron beam unit 200 according the principles taught herein. The example modular electron beam unit 200 includes an electron beam source 202 and a membrane window 204. The electron beam source 202 includes a base portion 206 and a field emitter element 208 coupled to the base portion 206. One end of the field emitter element 208 is proximate to the base portion 206, and the opposite end is formed as a field emitter tip 210. A gate electrode 212 is positioned relative to the second end of the at least one field emitter element, to apply a potential difference relative to the field emitter tip 210 to extract electrons (via tunneling) from the field emitter tip 210 to form an electron beam. In this example, an electrically insulating or poorly conductive stand-off enclosure 213 is disposed between and spaces apart the membrane window 204 from the gate electrode 212. The membrane window 204 is formed from a material that is selectively transmissive to electrons while remaining impermeable to gas molecules. In addition, the membrane window 204 is coupled to the stand-off enclosure 213 such that the modular electron beam unit has low permeability to oxidizing gaseous molecules, which can degrade the performance of the field emitter.

In this example, the membrane window 204 can be configured to serve as an anode to accelerate the electron beam emitted at the field emitter tip. The membrane window 204 can be formed from and/or include a single monolayer or multiple monolayers of graphene or other allotrope of carbon.

In a non-limiting example, the modular electron beam unit 200 can include an electrically insulating dielectric material 214 having low permeability to gas molecules oxidizing gaseous molecules that surrounds at least a portion of the field emitter element 208. The dielectric material 214 and standoff enclosure 213 can serve as a modular housing unit.

Figure 3:
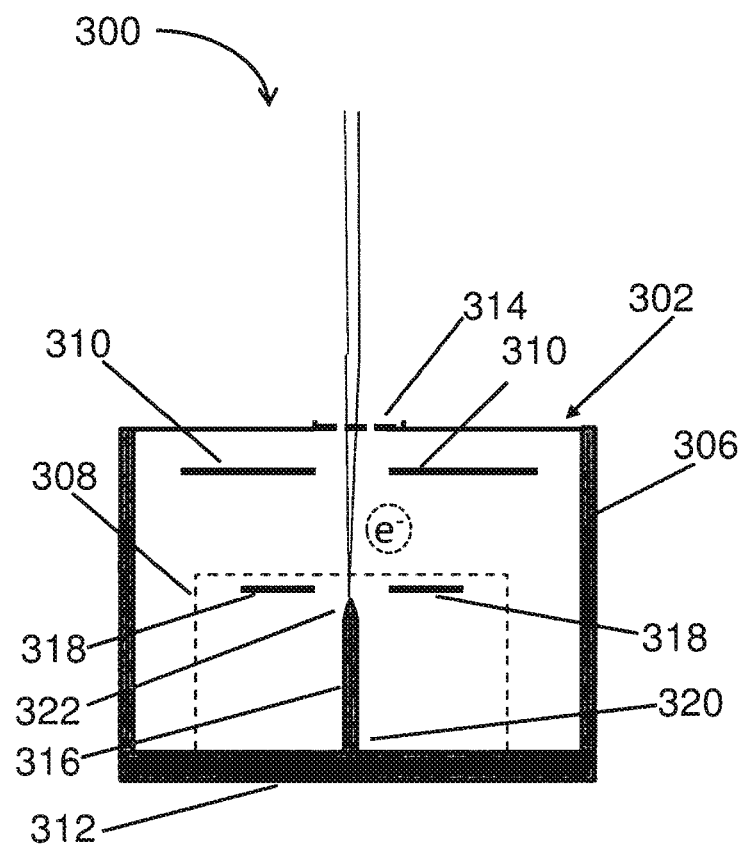
FIG. 3 shows a cross-sectional view of another example modular electron beam unit, according the principles herein.

FIG. 3 shows a cross-sectional view of another example modular electron beam unit 300 according the principles taught herein. The example electron beam unit 302 includes a modular housing unit 306 that is selectively impermeable to gas molecules including oxidizing gaseous molecules, an electron beam source 308 disposed in the modular housing unit, and at least one anode component 310 disposed in the modular housing unit 306. The modular housing unit 306 includes a base portion 312 and a membrane window 314 that is selectively transmissive to electrons while remaining impermeable to gas molecules. The electron beam source 308 includes at least one field emitter element 316 disposed over the base portion 312 and at least one gate electrode 318. Field emitter element 316 is formed with a first end 320 disposed proximate to the base portion 312 and a second end formed with a field emitter tip 322. The gate electrode 318 is disposed proximate to the second end of the field emitter element 316, and is used to apply a potential difference proximate to the field emitter tip, thereby extracting electrons (via tunneling) from the at least one field emitter tip to form the electron beam (e⁻) emitted from the electron beam source 308. The anode component 310 is configured to accelerate the electron beam in a path directed at the window 314 of the modular housing unit 306.

In this example, the membrane window 314 can be formed from and/or include a single monolayer or multiple monolayers of graphene or other allotrope of carbon.

Figure 4:
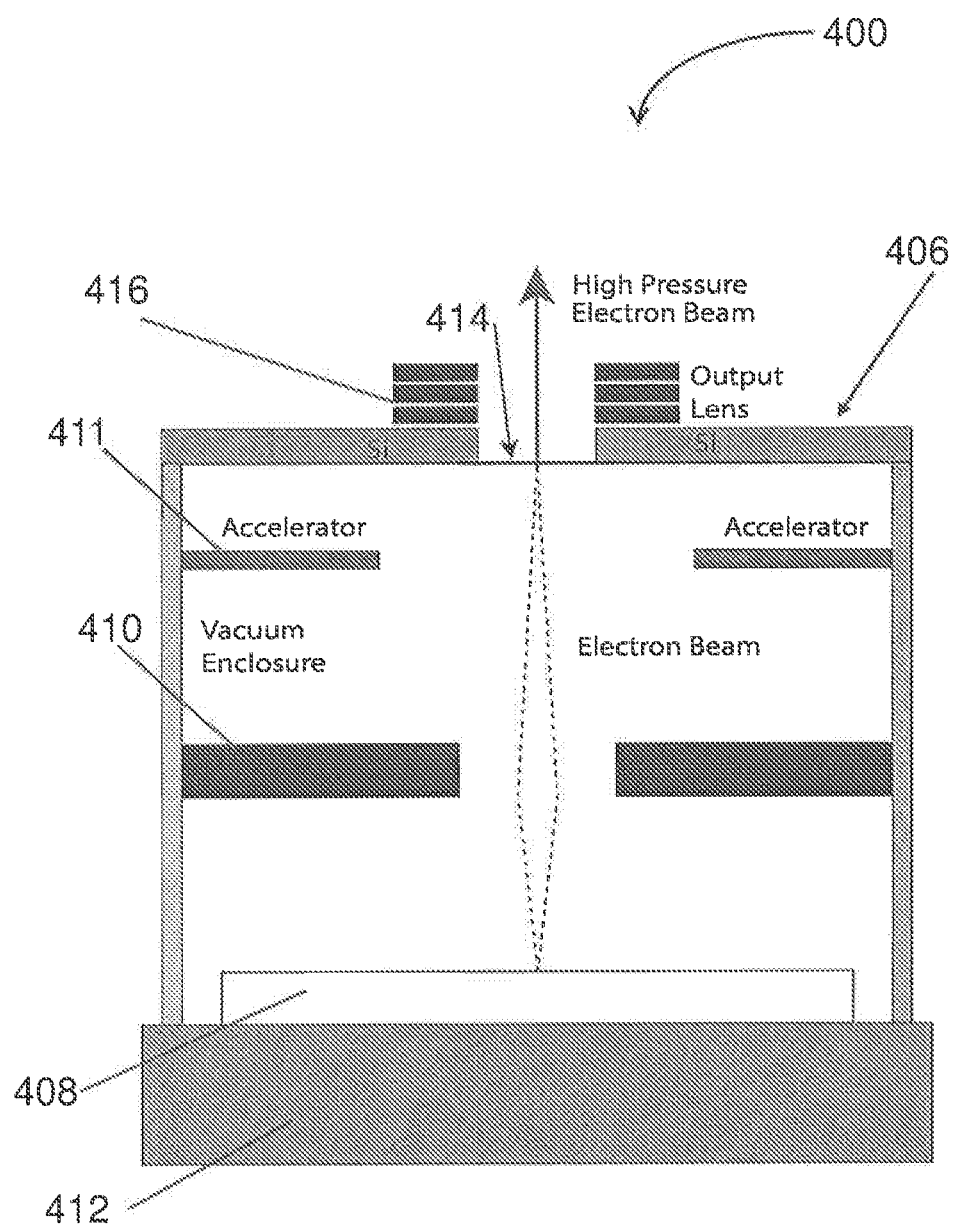
FIG. 4 shows a cross-sectional view of another example modular electron beam unit, according the principles herein.

FIG. 4 shows a cross-sectional view of another example modular electron beam unit 400 according the principles taught herein. The example modular electron beam unit 400 includes a modular housing unit 406 that is selectively impermeable to oxidizing gaseous molecules, an electron beam source 408 disposed in the modular housing unit, and at least one accelerator component at least one electrostatic electrode 410 disposed in the modular housing unit 406. The modular housing unit 406 includes a base portion 412 and a membrane window 414 that is selectively transmissive to electrons while remaining impermeable to gas molecules. The modular electron beam unit may include at least one anode component 411 to accelerate the electron beam in a path directed at the membrane window 414 of the modular housing unit 406. As shown in FIG. 4, the modular electron beam unit also can include at least one output lens 416 positioned outside the modular housing unit 406 proximate to the window 414. The electron beam source 408 of FIG. 4 includes at least one field emitter element having a first end disposed over the base portion 412 and a field emitter tip at a second end. At least one gate electrode is disposed to apply a potential difference proximate to the field emitter tip, thereby extracting electrons (via tunneling) from the at least one field emitter tip to form the electron beam (e⁻) emitted from the electron beam source 508 in a direction away from the at least one field emitter tip.

In this example, the at least one electrostatic electrode 410 can be configured as an Einzel lens, including three or more sets of cylindrical or rectangular lenses in series.

In this example, the membrane window 414 can be formed from and/or include a single monolayer or multiple monolayers of graphene or other allotrope of carbon.

Figure 5:
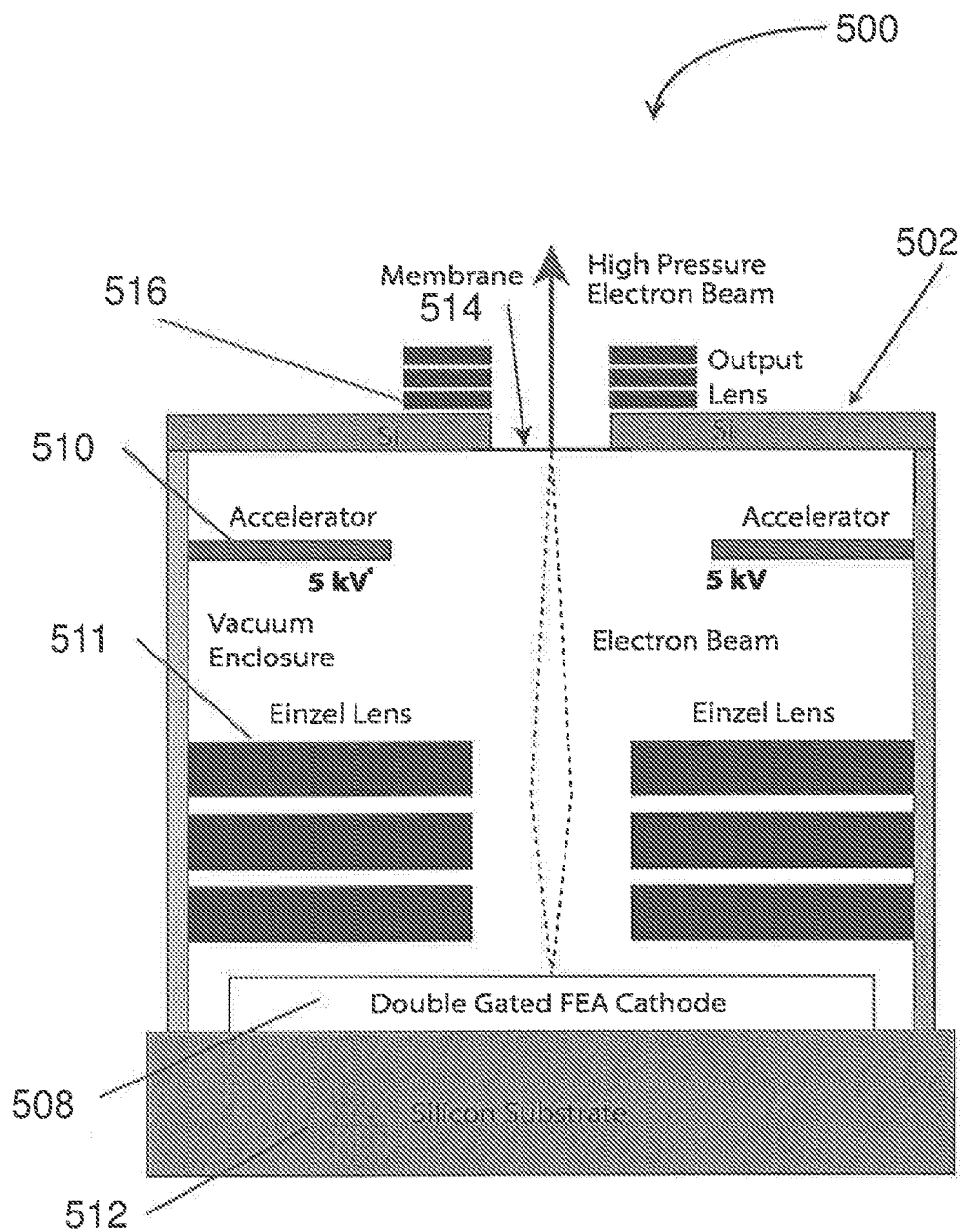
FIG. 5 shows a cross-sectional view of the structure of another example modular electron beam unit, according the principles herein.

FIG. 5 shows a cross-sectional view of the structure of another example modular electron beam unit 500 according the principles taught herein. The example modular electron beam unit is based on a two-dimensional array of single-gated or double-gated field emitter arrays (FEA). The example modular electron beam unit 500 includes a modular housing unit 506 that is selectively impermeable to oxidizing gaseous molecules, an electron beam source 508 (the single-gated or double-gated FEA) disposed in the modular housing unit, and at least one accelerator component 510 disposed in the modular housing unit 506. The modular housing unit 506 includes a base portion 512 and a membrane window 514 that is selectively transmissive to electrons while remaining impermeable to gas molecules. In this example, the modular electron beam unit also includes Einzel lens 511 to focus the electron beam and an accelerator 510 to accelerate the electron beam in a path directed at the window 514 of the modular housing unit 506. In another example, the Einzel lens can be eliminated. As shown in FIG. 5, the modular electron beam unit includes output lens 516 positioned outside the modular housing unit 506 proximate to the window 514. The electron beam source 508 of FIG. 5 includes a plurality of field emitter elements, each having a first end disposed over the base portion 512 and a field emitter tip at a second end, and the gate electrodes disposed to apply a potential difference relative to the field emitter tips. The double-gated field emitter structure can be used to focus the emitted electron beam (e⁻), and at the same time attract ions streaming back to the emitter tips.

In this example, the membrane window 514 can be formed from and/or include a single monolayer or multiple monolayers of graphene or other allotrope of carbon.

In an example implementation, including in connection with the example of any of FIGS. 1 through 5, the voltage applied at the gate electrode structure can be pulsed, resulting in pulse electron beam generation.

In any example implementation, including in connection with the example of any of FIGS. 1 through 5, the modular housing unit can be configured to exhibit low permeability gas molecules including to oxidizing gaseous molecules. Exposure to the oxidizing molecules or other gas molecules (such as but not limited to helium) can degrade the performance of the field emitter element and gate electrodes of the modular electron beam units. In an example, the modular housing unit can be configured to be impermeable to the gas molecules.

In any example implementation, including in connection with the example of any of FIGS. 1 through 5, the modular housing unit and the window can be configured to form a hermetic seal of the modular electron beam unit. The region between the window and the field emitter tip can include an inert gas. In any example, the modular electron beam unit can be at a partial pressure or a vacuum. As non-limiting examples, the pressure in the modular electron beam unit can range from about 1.0 milliTorr to about $1.0 \times 10^{-9}$ Torr. In an example, the region of the compact electron beam source with the field emitters can be maintained at a high or ultra-high vacuum (such as but not limited to ranging from about $1.0 \times 10^{-7}$ Torr to about $1.0 \times 10$ Torr), while other regions of the compact electron beam unit can be maintained at a higher pressure (such as but not limited to about 1.0 mTorr).

In any example implementation, including in connection with the example of any of FIGS. 1 through 5, the modular housing unit can include a plurality of sections that allow passage of multiple, differing electron beams, or differing beams in differing regions. One or more of the plurality of sections can be formed with a membrane window that is transmissive of the electron beam while remaining impermeable to gas molecules.

In any example implementation, including in connection with the example of any of FIGS. 1 through 5, the modular housing unit can be fabricated as a high-voltage packaging technology, such as but not limited to, based on micromachined MEMS structures or based on metal sealed structures. In an example, the modular housing unit can be formed from macro-machined stainless steel based packaging.

In any example implementation, including in connection with the example of any of FIGS. 1 through 5, the window can be a membrane formed from a two-dimensional material. As non-limiting examples, the window can be formed from a single monolayer, or multiple monolayers, of molybdenum disulphide, a nitride material (such as, but not limited to, thin $Si_3N_4$), an oxide material, silicene, or any combination thereof. In another example, the membrane window can be formed from a single monolayer, or multiple monolayers, of any two-dimensional allotrope of silicon, such as but not limited to silicene.

In any example implementation, including in connection with the example of any of FIGS. 1 through 5, the window can be configured with any shape, such as but not limited to a circular, rectangular, square, polygonal, oval, or any other shaped window that can be coupled to a region of the modular housing unit.

In any example implementation, including in connection with the example of any of FIGS. 1 through 5, the lateral dimensions and thickness of the window is determined based on the pressure differentials expected to be generated between the pressure outside the modular electron beam unit as compared to pressure internal to the modular housing. As a non-limiting example, a $Si_3N_4$ film with thickness 30 nm, and lateral area of 0.3 mm×0.3 mm may be used to withstand a pressure of about 3 atmosphere (as compared to the pressure internal to the modular electron beam unit.

In any example implementation, including in connection with the example of any of FIGS. 1 through 5, a thin membrane anode can be used that is transparent to emitted electrons, but impervious to gas molecules, can be used to separate an ultra-high vacuum (UHV) side of the modular electron beam unit from a poor vacuum side of the modular electron beam unit. The pressure differential on the membrane anode (between the UHV side and the poor vacuum side) can be on the order of about $10^{-6}$ Torr.

In any example implementation, including in connection with the example of any of FIGS. 1 through 5, the membrane window can be formed as a thin film layer of a material that is an insulating dielectric in bulk form. In any example aspect, the dielectric material can include an oxide, a nitride, or any other dielectric form of aluminum, silicon, germanium, gallium, indium, tin, antimony, tellurium, bismuth, titanium, vanadium, chromium, manganese, cobalt, nickel, copper, zinc, zirconium, niobium, molybdenum, palladium, cadmium, hafnium, tantalum, or tungsten, or any combination thereof.

In any example implementation, including in connection with the example of any of FIGS. 1 through 5, the base portion can include at least one logic chip, with at least one field emitter element being in electrical communication with the at least one logic chip. The at least one logic chip includes at least one processing unit.

In any example implementation, including in connection with the example of any of FIGS. 1 through 5, the field emitter elements can be formed as one-dimensional arrays, two-dimensional arrays, or staggered three-dimensional arrays. Each array includes a number of field emitter elements disposed over a substrate. The field emitter elements each have a longitudinal symmetry, with a high aspect ratio of height to lateral dimension as described in greater detail below. As a non-limiting example, the field emitter elements can be fabricated in an array at a pitch of about 45 microns or less, about 40 microns or less, about 30 microns or less, about 20 microns or less, about 15 microns or less, about 10 microns or less, about 5 microns or less, about 2 microns or less, or about 1 micron or less. Each field emitter element includes a field emitter tip to emit electrons as described in greater detail below.

A staggered three-dimensional array according to the systems, apparatus and methods herein can be configured as multiple two-dimensional arrays that are dynamically mounted, such that one or more of the two-dimensional arrays may be displaced, and thereby staggered, relative to the other two-dimensional arrays in the direction of the electron emission.

An electron beam unit according to the principles described herein includes a plurality of field emitter elements disposed in at least one field emitter array. Each field emitter element can include a gated vertical transistor, or an ungated vertical transistor, or a current controlled channel that is proximate to an optically-modulated current source in series with a field emitter.

Figure 6:
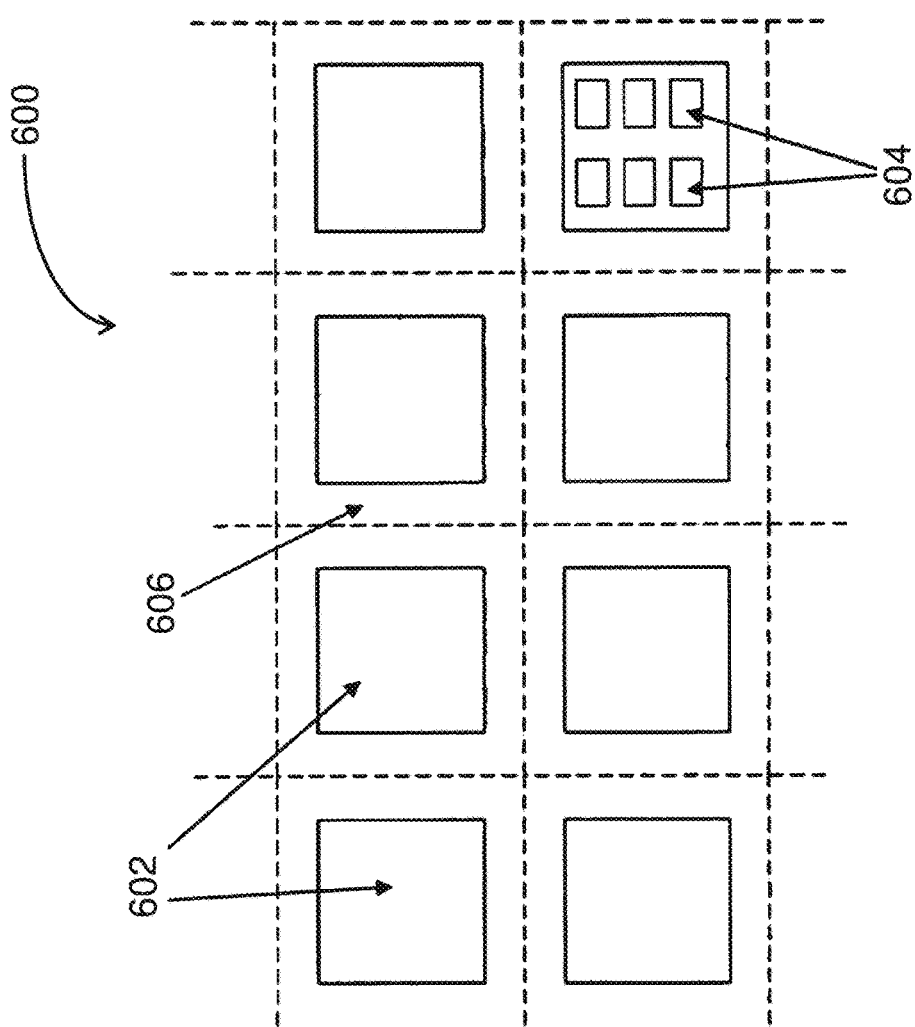
FIG. 6 shows a top view of one or more field emitter array regions, according the principles herein.

FIG. 6 shows a top view of one or more field emitter array regions disposed over the base portion of a modular housing unit of a non-limiting example electron beam source 600. The example electron beam source 600 can be configured as a modular electron beam unit described in connection with any of FIGS. 1 through 5. Each array region 602 including an array of field emitter elements. Each field emitter element of an example field emitter array can be formed as described in connection with any of the examples described herein. FIG. 6 shows a non-limiting example of an arrangement of a plurality of field emitter arrays 604 that are included in a field emitter array region. The system may also include regions 606 that do not include field emitter elements.

An example modular electron beam unit according to the principles described herein is configured with control and logic capabilities. One or more logic chips and/or other control components can be disposed in a portion of the modular housing unit, such as but not limited to in the base portion. In an example, the field emitter array can be controlled using a logical shift register of the logic chip. The shift register facilitates a pattern of "ON" and "OFF" regions to be stored on the logic chip.

The electron beam apparatus can be configured to allow selective activation of one or more of the field emitter elements, such as but not limited to, based on processor-executable instructions executed at a logic chip or other control component located in or coupled to the modular housing unit (including in the base portion).

In an example, to make contact between the logic chip and the electron beam source, 3-D integration techniques such as through-silicon vias (TSVs) or micro-bump bonds, can be used to transfer the signals between the logic chips. The control and logic can be implemented using any of the control logic chips described in connection with any of the examples herein.

In any example herein, each field emitter element can be configured as a high aspect-ratio structure having a first end and a second end. The first end of the field emitter element is disposed proximate to a base. In an example, each field emitter element can include a current channel region disposed proximate to the first end, and a donor-doped region or an acceptor-doped region disposed proximate to the second end, thereby providing a field emitter element that acts as an ungated vertical transistor. In another example, each field emitter element can include a current channel region disposed proximate to the first end, a donor-doped region or an acceptor-doped region disposed proximate to the second end, and a conductive material disposed at a portion of the field emitter element, with an insulator between the current channel and the conductive material (to act as a transistor gate electrode), thereby providing a field emitter element that acts as a gated vertical transistor.

In an example where a donor-doped region is disposed proximate to the second end, the region donor-doped region acts as an accumulation layer. In an example where an acceptor-doped region is disposed proximate to the second end, the region acceptor-doped region acts as an inversion layer. In any example herein, the donor-doped region or acceptor-doped region can be lightly doped or highly-doped.

In an example, the donor-doped region or acceptor-doped region of the current source (including a field emitter element) can be formed from a semiconductor material that is doped with n-type dopants or p-type dopants such that its conductivity varies from more insulating (e.g., about $10^7$/$cm^3$ carrier density or less) to more conductive (e.g., about $10^{16}$/$cm^3$ carrier density or more), including values of carrier density within the range from about $10^7$/$cm^3$ to about $10^{16}$/$cm^3$. In an example, the donor-doped region can be formed from a Group III-IV semiconductor, such as but not limited to aluminum phosphide, aluminum arsenide, gallium arsenide, or gallium nitride, doped with selenium, tellurium, silicon, or germanium. As a non-limiting example, the donor-doped semiconductor material can be n-type doped GaAs (e.g., GaAs doped with Si). In an example, the acceptor-doped region can be formed from a Group III-IV semiconductor doped with, e.g., silicon, germanium, beryllium, or cadmium. In another example, the donor-doped region can be formed from silicon or germanium doped with phosphorus, arsenic, antimony, or bismuth. In another example, the acceptor-doped region can be formed from silicon or germanium doped with boron, aluminum, or gallium.

In any example implementation, including in connection with the example of any of FIGS. 1 through 6, the gate electrode layer can include at least two layers, including a dielectric layer disposed proximate to the field emitter elements and a conductive layer disposed over the dielectric layer. The conductive layer can be formed from, as non-limiting examples, a conductive metal, a conductive metal oxide, or a doped semiconductor material. For example, the conductive layer can be based on gold, platinum copper, tantalum, tin, tungsten, titanium, tungsten, cobalt, chromium, silver, nickel or aluminum, or a binary or ternary system of any of these conductive materials. In another example, the conductive layer can be based on a doped semiconductor material, such as but not limited to doped forms of amorphous silicon, poly-crystalline silicon, germanium, a carbon-based conductor, a III-IV semiconductor system, or other semiconductor alloy system, or any combination of these doped semiconductor materials. Non-limiting examples of III-IV semiconductor systems or semiconductor alloy systems include but are not limited to GaAs, InP, InAs, InSb, InGaAs, AlGaAs, InGaP, AlInAs, GaAsSb, AlGaP, CdZnTe, AlGaN, or any combination thereof. For example, the conductive layer can be formed from a heavily n-doped poly-crystalline silicon.

In any example implementation, including in connection with the example of any of FIGS. 1 through 6, the at least one field emitter elements can be configured as an array of individually addressable electron sources, to generate individual focused or collimated electron beamlets. As non-limiting examples, the array can be formed as a one-dimensional array or a two-dimensional array. For example, a two-dimensional array can include greater than about $1 \times 10^6$ individually-addressable electron sources.

In any example implementation, including in connection with the example of any of FIGS. 1 through 6, the field emitter tips of the field emitter elements can be fabricated to have a tip radius of less than about 10 nm. In various examples, the example field emitter tips can be fabricated to have a tip radius of about 1 nm or less, about 2 nm, about 3 nm, about 4 nm, about 5 nm, about 8 nm, about 10 nm, about 12 nm, about 15 nm or more. Each field emitter element can be configured as having a substantially cylindrical geometry having a substantially circular cross-section (in a pillar structure). In other examples, the field emitter elements can be fabricated in arrays of longitudinal structures having differing geometries, including structures having substantially rectangular, triangular, oval or other polygonal cross-section, or structures having lateral dimension that taper or otherwise vary, including tapering from base to tip (such as pyramid-shape structures).

In any example implementation, including in connection with the example of any of FIGS. 1 through 6, the 1-D or 2-D arrays described herein could be configured for time-multiplexed, matrix-addressed and row-scanned operation of the field emitter elements.

In a non-limiting example, the field emitter elements can be made out of silicon, germanium, carbon, a Group III-V semiconductor system, or other semiconductor alloy system, or any combination of these semiconductor materials, or other conductive materials, as the current sources. In any of the examples described herein, the conductive material can be but is not limited to a transition metal (including a refractory metal), a noble metal, a semiconductor, a semi-metal, a metal alloy, or other conductive material. In an example, the metal or metal alloy can include but is not limited to aluminum, or a transition metal, including copper, silver, gold, platinum, zinc, nickel, titanium, chromium, or palladium, tungsten, molybdenum, or any combination thereof, and any applicable metal alloy, including alloys with carbon. In an example, the field emitter element can be a refractory metal. In an example, the conductive material can be a conductive polymer or a metamaterial. In other non-limiting example, suitable conductive materials may include a semiconductor-based conductive material, including other silicon-based conductive material, indium-tin-oxide or other transparent conductive oxide, or Group III-V conductor (including GaAs, InP, and GaN). Other non-limiting examples of III-V semiconductor systems or semiconductor alloy systems include but are not limited to InAs, InSb, InGaAs, AlGaAs, InGaP, AlInAs, GaAsSb, AlGaP, CdZnTe, AlGaN, or any combination thereof. The semiconductor-based conductive material can be doped. The field emitter array can be formed from an array of high aspect-ratio nanoscale systems formed from conductive or semi-conductor materials, including nanoparticles, nanoshells and/or nanowires. As another example, field emitter array can be formed from an array of high aspect-ratio nanoscale systems of carbon, including single-walled and multi-walled carbon nanotubes, nanofibers, nanohorns, nanoscale hetero-junction structures, graphene-based nanostructures, and carbon nanoribbons (including graphene nanoribbons and graphitic nanoribbons). In other examples, the field emitter element can include diamond, or other conductive carbon-based material. In any of the examples herein, the field emitter element can be formed from an electrically non-conductive material that includes a coating or other layer of an electrically conductive material.

In an example aspect, the field emitter tip can be formed from a portion of the field emitter element and/or can be formed from coating or otherwise layering a portion of the field emitter element with a conductive material (including any conductive material described herein).

As a non-limiting example, the field emitter arrays described herein can be fabricated to have a high aspect ratio of height to lateral dimension, such as but not limited to, aspect ratios of height to lateral dimension ranging from about 5:1 or more, about 10:1 or more, about 50:1 or more, about 100:1 or more, about 200:1 or more, about 500:1 or more, about 800:1 or more, about 1000:1 or more, or about 5,000:1 or more. In an example, the field emitter elements can have a height of around 10 microns. In other examples, the array can include longitudinal structures of differing heights, such as but not limited to about 0.5 microns, about 1 micron, about 5 microns, about 15 microns, about 20 microns or about 30 microns or more.

As a non-limiting example, the field emitter arrays described herein can be fabricated to provide current limiters in series, for uniformity and reliability. For example, the field emitter elements can be formed as a plurality of silicon pillar current limiters in series, which can facilitate greater uniformity and reliability.

An example modular electron beam unit herein can include a plurality of electrostatic electrodes. The electrostatic electrodes could be integrated with each field emitter element for the purpose of shaping, and accelerating the electron beamlets (i.e., the electron beam from an individual or small number of field emitter element). These electrostatic electrodes can include at least one additional extraction gates and/or one or more focusing lenses, to form collimated and/or focused electron beamlets. As a non-limiting example, microfabricated Einzel lenses could be integrated with individual field emitters, or groupings of two more field emitters, to form collimated or focused beamlets. The example modular electron beam unit can also include additional microfabricated electron optical elements, such as but not limited to at least one acceleration grid and/or at least one stigmation corrector. The example modular electron beam unit can include types of electron optics to form a nano-electron optical column. In various examples, the electron optics can be electrostatic electron optics or magnetic electron optics. An example modular electron beam unit herein can be configured to act on each individual beamlets or on groups of beamlets. In the various examples herein, a beamlet could be generated by an individual field emitter, or a beamlet could be generated by a grouping of two more field emitters.

An example modular electron beam unit herein can include arrays of field emitter elements that can be regulated to switch the emission current. In an example, the emission current can be regulated by placing a current limiter (also referred to herein as a current channel region) in series with the field emitter element to controls the supply of electrons to the tunneling barrier. In an example, by modulating the emission current of individual field emitter elements, the currents of all of the electron beams in an array can be equalized despite field emitter tip radii variations, resulting in more uniform emissions.

In an example, the input electron beam can have a value of power ranging from about 2.5 W to about 10 W.

In an example, the beam can have a value of current ranging from about 500 μA and about 1500 μA.

For any example modular electron beam unit herein, the regulated current limiters can be implemented to allow for the control of the emission current of individual field emitters. In a first example, a logic control element (such as but not limited to a CMOS logic control chip) can be coupled to a gate electrode of a vertical transistor formed from a field emitter element, to switch the transistor current source on and off, thereby providing a field emitter element that is a controlled current source.

Example devices based on the modular electron beam unit according to the principles herein, including a laser (such as bot not limited to a deep UV laser), can be made portable and handheld devices. Non-limiting examples of such devices include chemical agent sensors, biological agent sensors, air purifiers, spectrometers, pattern writing and etching, fabrication mask generation, vertical-cavity surface-emitting (VCSEL) semiconductor laser diodes, edge-emitting semiconductor laser diodes, non-linear photonic crystals, light emitter diodes, electrically driven microcavity lasers, and electron-pumped gas lasers. Example devices that can use compact modular cathodes are ion sources for mass spectrometers, ion sources for neutron generators, x-ray sources, e-beam pasteurization of food, e-beam sterilization. Other non-limiting example applications include crosslinking, polymer degradation, sterilization, pasteurization, and vulcanization.

In a non-limiting example, a modular electron beam unit according to the principles herein can be implemented as a laser, such as but not limited to a deep ultraviolet (UV) laser. Existing deep UV lasers, such as KrF (250 nm) and ArF (193 nm) excimer lasers can be desktop size or larger. The compact modular electron beam units herein can be used to provide pump semiconductor gain material to provide lasers that are 10,000 times to 100,000 times smaller than existing technology, with at least 10 times greater efficiency, and using about 1 Watt of power.

Figure 7:
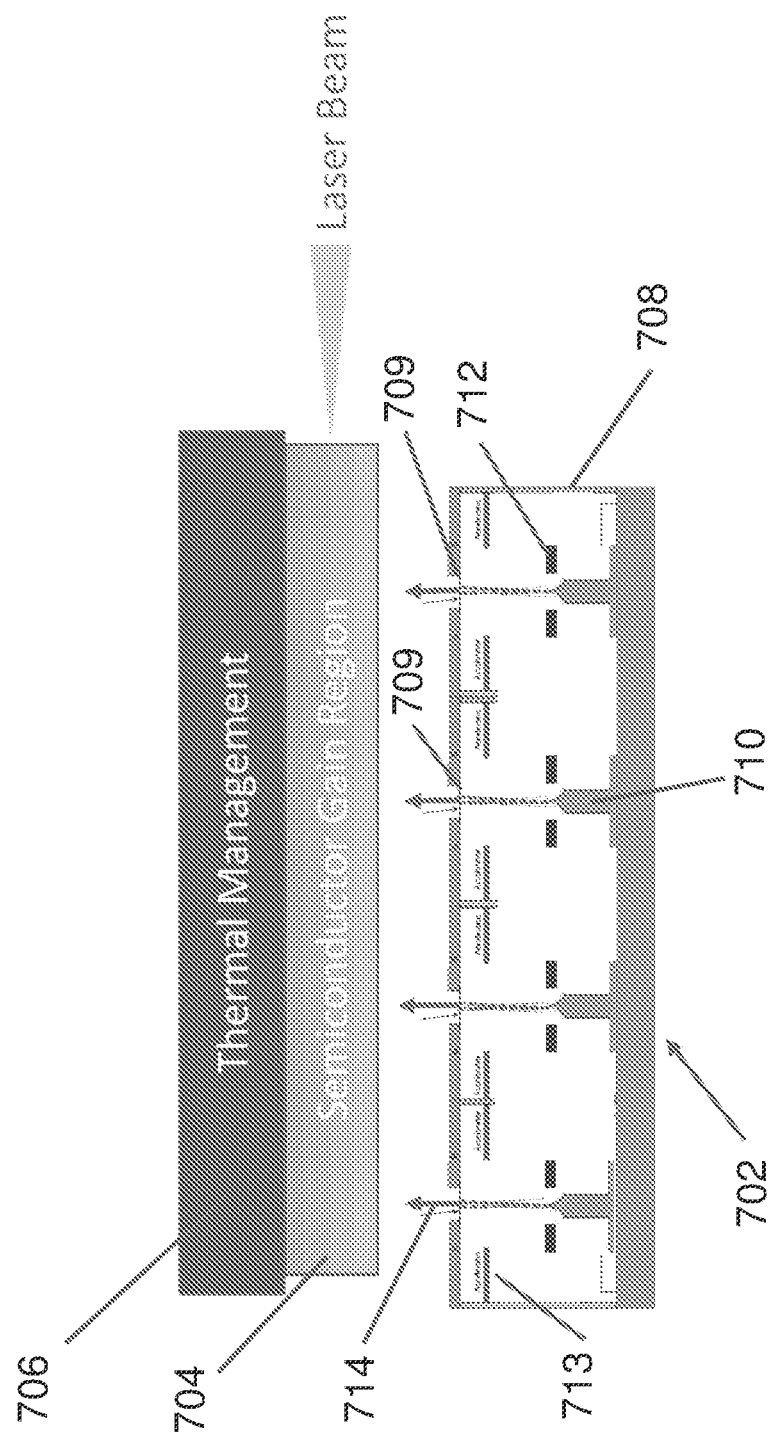
FIG. 7 shows cross-sectional views of an example laser, according the principles herein.

FIG. 7 shows cross-sectional views of a non-limiting example laser that include at least one modular electron beam unit 702, a semiconductor gain region 704 disposed proximate to the membrane window of the at least one modular electron beam unit, and a thermal management unit 706 that forms thermal contact with the semiconductor gain material 704. As taught herein, the modular electron beam unit 702 includes a modular housing unit 708, membrane windows 709 formed in regions of the modular housing unit 708, field emitter elements 710 disposed over a base portion of the housing unit 708, gate electrodes 712, and anodes 713 to accelerate the electron beams 714 towards a respective membrane window 709. In this example, the modular electron beam unit is formed with a modular housing unit having multiple membrane windows 709. The modular electron beam unit 702 can be formed as described in connection with any example herein, including the example of any of FIGS. 1 through 6. Depending on the proximity of the semiconductor gain material 704 to the membrane window 709, the electron beams may experience scattering mainly from the membrane window before entering the semiconductor gain material layer.

Figure 8:
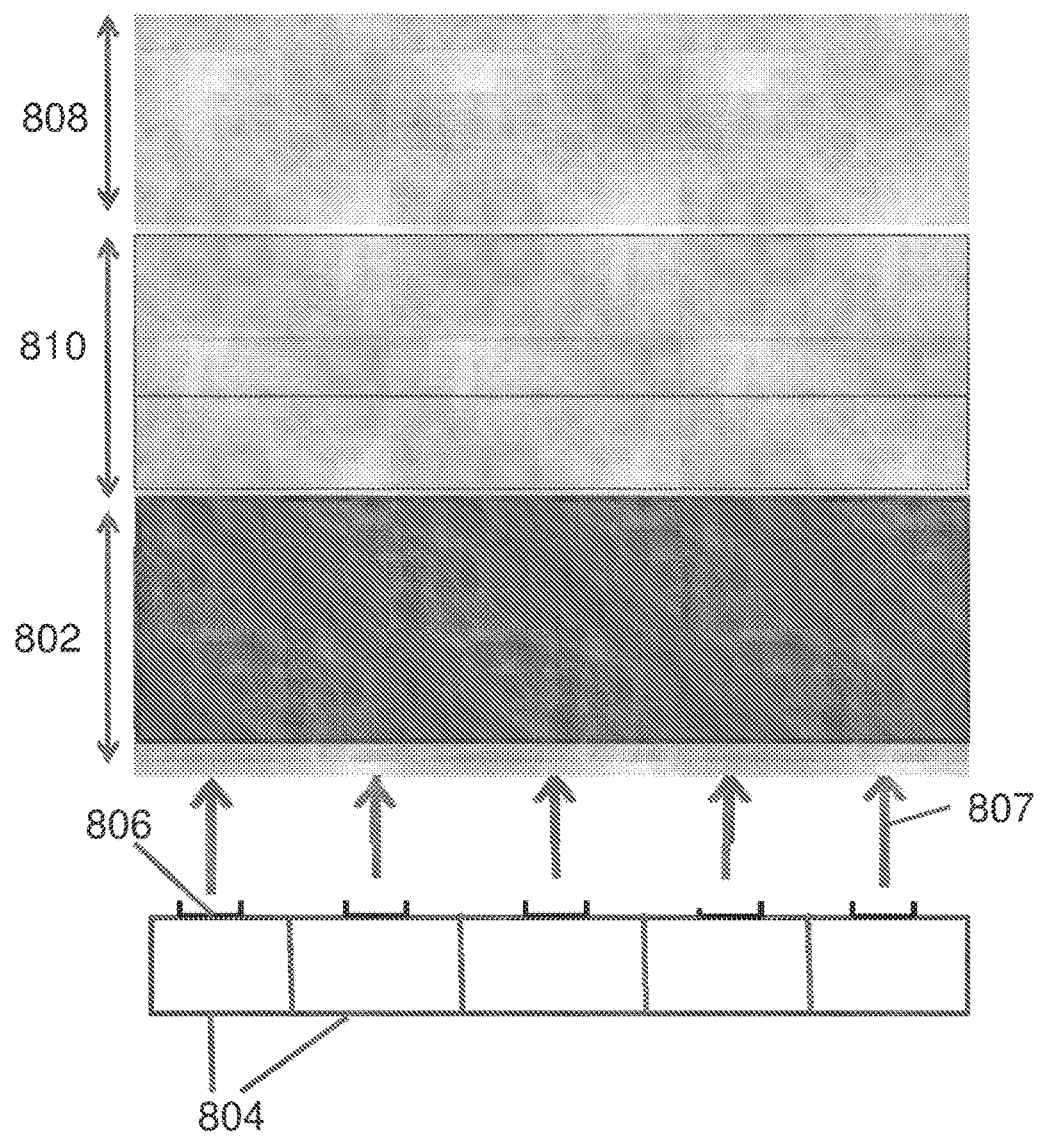
FIG. 8 shows a cross-sectional view of an example laser, according the principles herein.

FIG. 8 shows a cross-sectional view of an example laser formed from a semiconductor gain region 802, multiple modular electron beam units 804, and thermal management unit 808. The multiple modular electron beam units 804 are each formed of a modular housing unit including a membrane window 806 that is transmissive to the emitted electron beams 807. The modular electron beam units 804 can be formed as described in connection with any example herein, including the example of any of FIGS. 1 through 6. As shown in FIG. 8, a thermally conductive material 810 can be disposed between thermal management unit 808 and the semiconductor gain material 802, to assist with heat transfer.

In an example laser according to the principles herein, the semiconductor gain material can include aluminum, gallium, nitrogen, phosphorus, or any other gain material that can generate a beam of photons on exposure to the electron beams. The semiconductor gain material can be formed according to any applicable optical gain architecture in the art, including any applicable quantum well or optical waveguide architecture. In operation, hole/electron pairs are created by bombardment of the gain material by the energetic electrons. They penetrate into the gain material layers and energy is deposited by the electrons leading to hole/electron pair generation. The energy required to generate a hole/electron pair is proportional to the bandgap.

In an example laser according to the principles herein, the semiconductor gain material can be formed in multiple layers as a multiple quantum well (MQW) structure.

In a non-limiting example, the photon emission wavelength of the laser can be changed by changing the semiconductor gain material.

The example laser of FIG. 7 is configured as an edge-emitting laser diode. Edge emitting laser diodes are efficient semiconductor lasers, are scalable in surface area, and allow removal of waste heat using micro-scale coolers. In other examples, the example laser of FIG. 7 is configured as a multiplex of several edge emitters or several edge emitters pumped in parallel. In other examples, the gain material can be configured in other laser emission architectures.

In non-limiting examples, the thermal management unit can include a thermoelectric cooler, a MEMS-based pumped liquid cooling system, or a pumpless liquid cooling system.

In any example implementation, including in connection with the example of any of FIGS. 1 through 8, the field emitter elements can be configured as arrays of individually addressable and temporally controllable electron sources such that the individual electron beamlets can be separately turned ON and OFF, at times on the order of nanoseconds to microseconds. The field emitter elements also can be configured to generate differing strengths of individual the electron beamlets across the arrays. This allows spatial and temporal control of individual electron beamlets across the area of the field emitter array. In an example where separate the modular electron beam units are formed with multiple differing windows, the field emitter elements also can be configured for separately addressable control, such that the electron beamlets from the various windows can be separately turned ON and OFF, both temporally and spatially, across the arrangement of windows.

The example compact modular electron beam units according to the principles herein provide cold cathodes that can be implemented in demanding device applications. The example compact modular electron beam units are configured to reduce performance limitations caused by the sensitivity of field-emitted currents to emitter tip radii spread (spatial non-uniformity) and to fluctuation of the work function because of gas adsorption and desorption at the tip surface (temporal non-uniformity). In an example, the modular electron beam unit architecture herein is configured such that the electron emission and acceleration occurs in high vacuum, while the deposition of the energy in the laser gain medium can occur at ambient conditions. The electrons pass through a membrane window that is transparent to electrons but impermeable to ambient gas molecules.

In an example, the modular electron beam unit is configured with a two-dimensional array of closely packed electron sources based on scaled field emission arrays that are individually regulated by high aspect ratio silicon current limiters. The modular electron beam units are enabled by the novel fabrication and characterization of high-aspect-ratio silicon nanowire current limiters (vertical ungated FETs) for ballasting individual field emitters. Dense (1 µm pitch) field emitter arrays (FEAs) that are individually regulated by 100 nm diameter, 10 µm tall Si nanowire current limiters can be fabricated as described herein, resulting in a field emitter tip radii under around 5 nm. The non-limiting example field emitter arrays can be configured with saturation currents of about 5 µA per emitter tip or about 35 Acm$^{-2}$. In other example, the field emitter arrays can be formed with current density greater than about 1 Acm$^{-2}$, which can be assembled into a modular electron beam unit formed as a 10 keV micro-electron gun with an electron transparent window. In an example, the modular electron beam unit can have a current density of less than about 50 A/cm$^2$. In an example, the modular electron beam unit can have a current density of between about 10 A/cm$^2$ and about 33 A/cm$^2$.

A non-limiting example modular electron beam unit taught herein can be configured to provide uniform emission of electrons using current limitation by Si nanowires, independent control of electron energy and current in a triode/tetrode architecture, reliable operation by current limitation preventing thermal runaway and Pt coating, the ability to fabricate multiple electron sources with redundancy, multiplex several edge emitters or pump several edge emitters in parallel, and a unique electron-transmissive window formed by a thin $Si_3N_4$ window.

The example modular electron beam unit architecture taught herein allows for independent optimization of cold electron sources. This allows optimization of other components of systems that use the modular electron beam units, including laser gain media and thermal management, without concern for outgassing that can be caused by gasses are desorbed by electron collision and temperature rise of the anode.

Figure 9A:
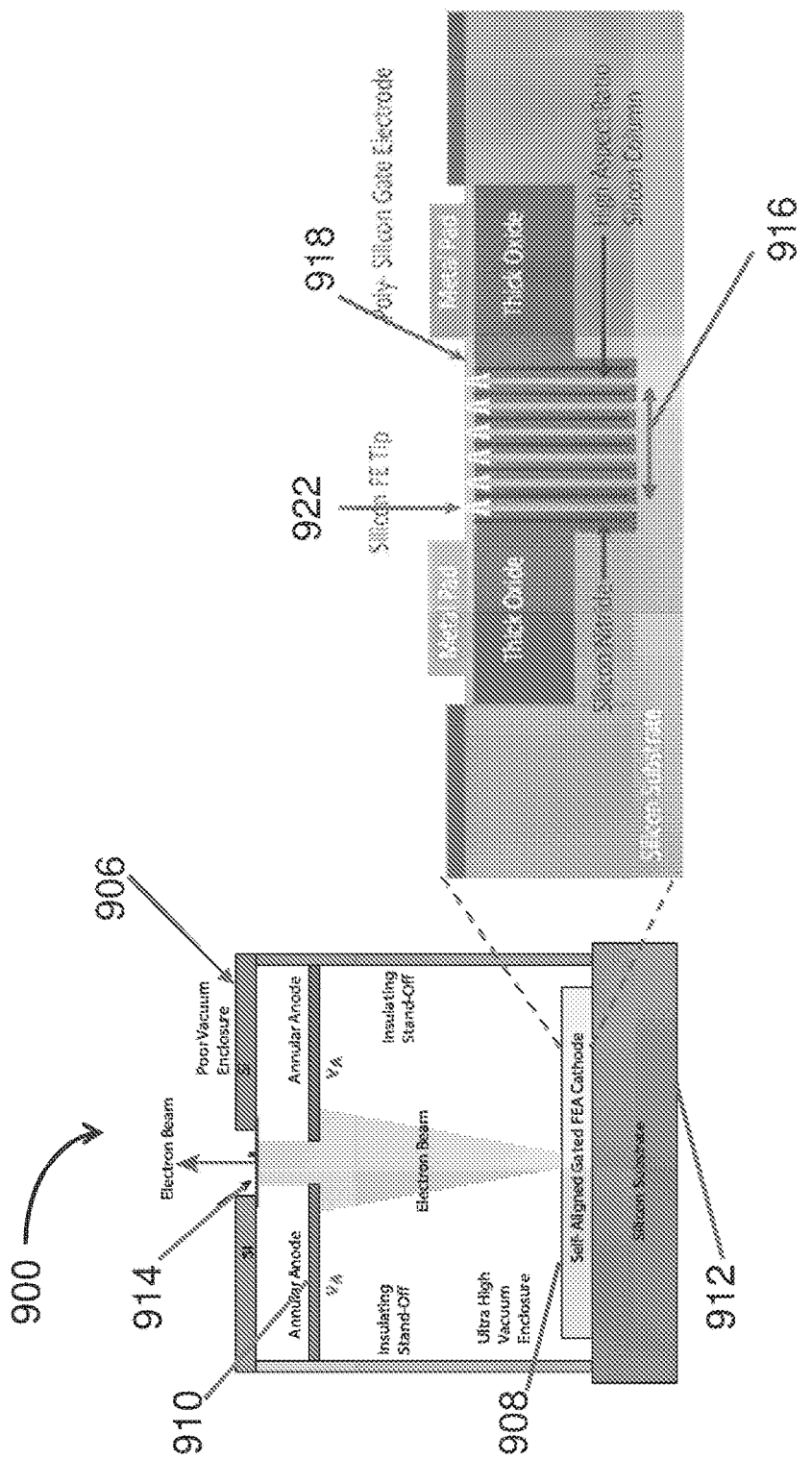
FIGS. 9A and 9B show cross-sectional views of an example modular electron beam unit, according the principles herein.
Figure 9B:
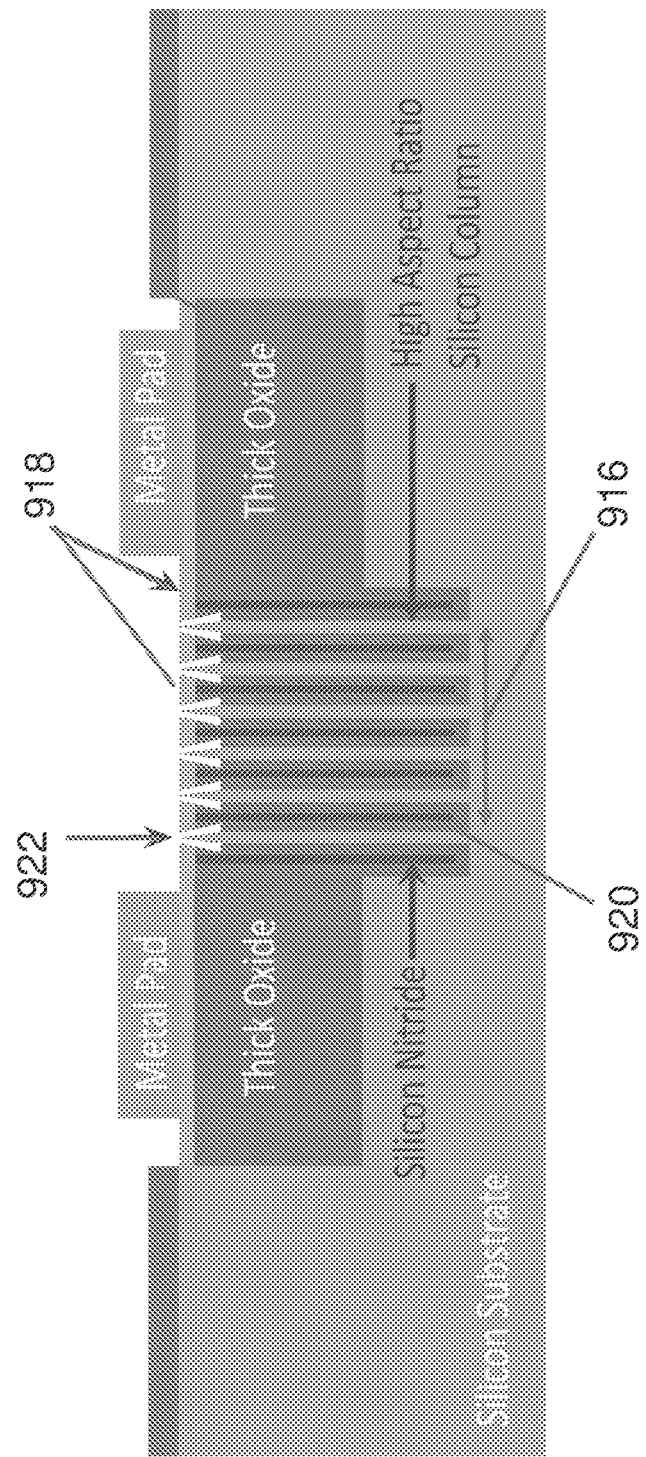

FIGS. 9A and 9B show cross-sectional views of another non-limiting example modular electron beam unit 900 according the principles taught herein. Similarly to the example modular electron beam unit 300 of FIG. 3, the example electron beam unit 900 includes a modular housing unit 906 that is selectively impermeable to oxidizing gaseous molecules, an electron beam source 908 disposed in the modular housing unit, and at least one anode component 910 disposed in the modular housing unit 906. The modular housing unit 906 includes a base portion 912 and a membrane window 914 that is selectively transmissive to electrons. The electron beam source 908 includes a number of field emitter elements 916 disposed over the base portion 912 and at least one gate electrode 918. Field emitter elements 916 are formed with a first end 920 disposed proximate to the base portion 912 and a second end formed with field emitter tips 922. The gate electrode 918 is disposed proximate to the second end of the field emitter element 916, and is used to apply a potential difference proximate to the field emitter tip, thereby extracting electrons (via tunneling) from the at least one field emitter tip to form the electron beam (e$^-$) emitted from the electron beam source 908. The anode component 910 is configured to accelerate the electron beam in a path directed at the window 914 of the modular housing unit 906.

The example modular electron beam unit 900 includes a two-dimensional array of electrons sources in which each field emitter element 916 is regulated by a current limiter. The field emission device includes a conical field emitter tip 922 (typical radius less than about 10 nm) at the end of the high aspect ratio silicon nanowire field emitter elements 916, which is centered in an aperture within a conducting extraction gate electrode 918. Application of a voltage between the extraction gate 918 and the emitter tip 922 results in the tunneling of electrons from the emitter tip 922. The emitted electrons can be accelerated towards (and proximity focused) on a semiconducting gain material. The example electron beam unit 900 can include add an additional focus electrode to collimate the electron beam, prevent beam divergence and preserve the brightness of the electron beam. The additional benefit of a focus electrode is that it helps to enhance the lifetime of the example electron beam unit 900 by preventing the back ion bombardment of the emitter tip by ions created by impact ionization of gasses.

The modular housing unit 906 of example modular electron beam unit 900 can be maintained such that that electron emission and acceleration occurs in high vacuum. The membrane window is transparent to electrons but impermeable to ambient gas molecules.

The example field emitter elements herein can be fabricated as a 2D array of closely-packed electron sources based on scaled FEAs that are individually regulated by high aspect ratio silicon current limiters. The example field emitter elements described herein can be configured for high current, high current density (greater than about 100.0 Acm$^{-2}$, about 1.1 µA per tip) Pt or Ir coated Si FEAs, and high-aspect-ratio silicon nanowire current limiters (vertical ungated field effect transistors (FETs)) for ballasting individual field emitters. To improve device reliability and lifetime, and reduce tip thermal runaway and back ion bombardment, current limiters can be added in series with the field emitters.

Figures 10A, 10B, 10C, 10D:
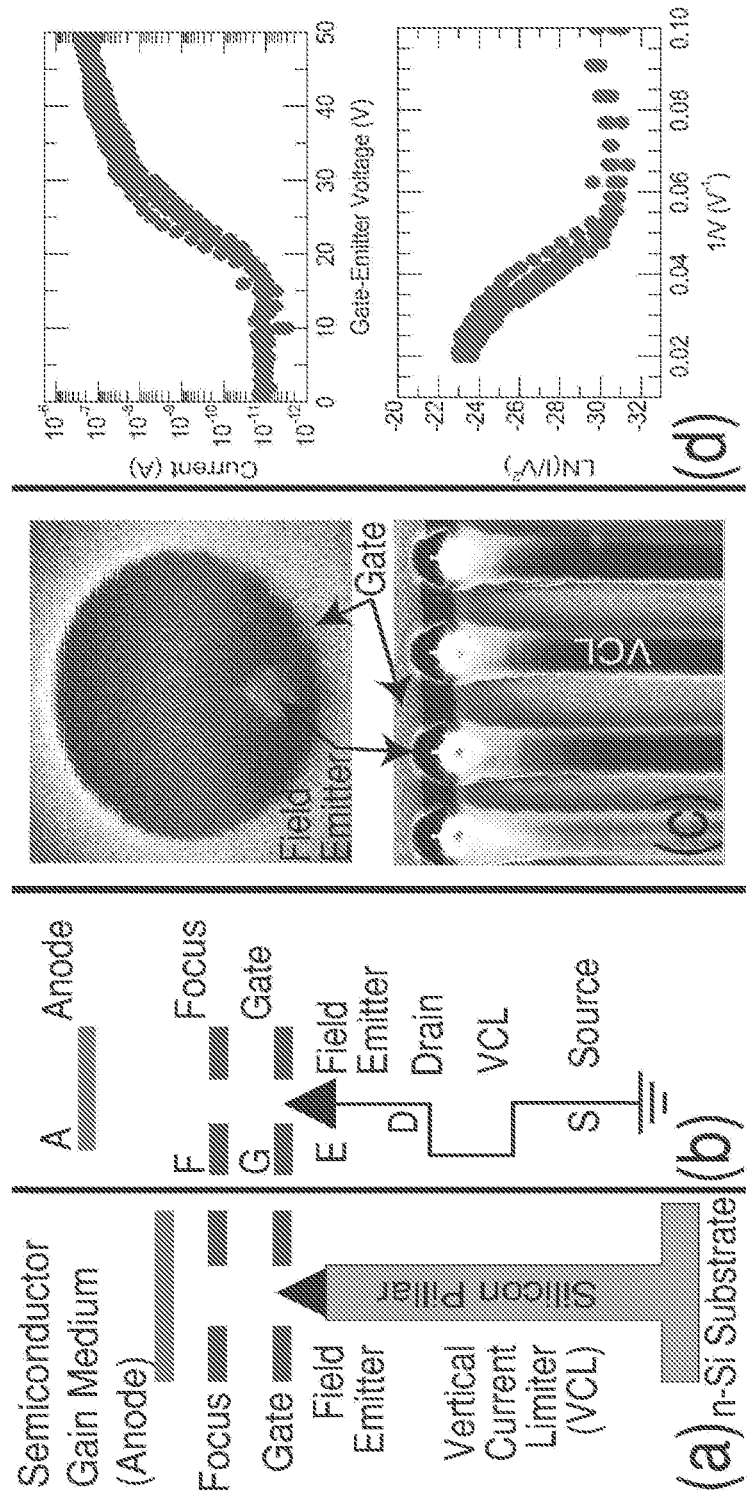
FIGS. 10A-10D show an example schematic diagram (10A), circuit diagram (10B), scanning electron microscope image (10C), and current-gate emitter voltage characteristics and Fowler-Nordheim plot of anode current (10D), according the principles herein

FIG. 10A shows a schematic diagram of an example FEA structure, showing a single field emitter regulated by a current course formed with a silicon nanowire (NW) vertical current limiter (VCL). FIG. 10B shows an example circuit diagram of the FEA structure. FIG. 10C shows example scanning electron microscope (SEM) images of the completed FEA structure. FIG. 10D show example plots of anode current—gate emitter voltage characteristics and Fowler-Nordheim (FN) plots of anode current of the example FEA structure. In an example implementation, dense (1 µm pitch) FEAs are fabricated that are individually regulated by 100 nm diameter and 10 µm tall current limiters with doping of $10^{13}$ cm$^{-3}$. The emitter tip radius is less than about 5.0 nm. Characterization of the current limiters show current-source like behavior, with saturation currents of 20 pA per current limiter, consistent with the low doping, narrow diameter and presence of surface states. When the current limiters are incorporated into large arrays of field emitters, the current-voltage characteristics of the FEA confirm current limitation at high extraction gate voltages, consistent with physical parameters shown in FIGS. 10A-10D. Using current limiters, the saturation current can be increased to about 5.0 µA per tip or more by increasing the pillar current limiters doping by a factor of $10^3$ (from $10^{13}$ cm$^{-3}$ to $10^{16}$ cm$^3$) and the emitter tip density by a factor of 25 (from $4\times10^6$ to $10^8$ tips/cm$^2$, and the emission current density to greater than about 100 A/cm$^2$.

In an example, the modular electron beam unit can be configured as a self-contained micro-electron gun for generating electron beams with energy of about 10 keV that are collimated and have high current density. The example micro-electron gun is based on cold cathodes with electrons accelerated to 10 keV by an annular anode and passed through a window that is transparent to the energetic electrons. The window is impermeable to gasses external to the vacuum packaging of the modular housing unit. The micro-electron gun includes self-aligned gate field emission arrays (FEAs) that are individually regulated with high aspect ratio silicon nanowire current limiter. In this example, the arrays can be single-gated field emission arrays or double-gated field emission arrays, to provide collimated electron beams. The window coupled to the modular housing unit can is made from material that is transparent to electron beams. In an example, In an example, it can be based on silicon nitride or single or multiple layers of graphene or other 2D material membranes micro-fabricated on silicon wafers. The accelerating electrode (anode) also can be integrated into the modular housing unit. In an example, a collimator or an Einzel lens also can be integrated into the modular housing unit for collimating the electrons. In an example, the modular housing unit can be fabricated as a high-voltage high-vacuum packaging, such as but not limited to, based on micro-machined MEMS structures or based on high-vacuum, metal sealed structures (including macro-machined stainless steel based package).

An example modular micro-electron gun according to the principles herein can be fabricated to have the electron beam characteristics of energy of about 10 keV, a current of about 500 µA, a current density of about 10 Acm$^{-2}$, divergence of less than about 1°, an a continuous-wave (CW) modulation.

Non-limiting example structural and device parameters of a modular electron beam unit according to the principles herein is listed in Table 1:

TABLE 1

| Field Emission Array Parameters | Value |
| --- | --- |
| Fowler-Nordheim Plot Slope, $b_{FN}$ | 750 V |
| Field Factor, β | $1.25 \times 10^6$ cm$^{-1}$ |
| Tip Density | $10^7$-$10^8$ cm$^{-2}$ |
| Current per Tip | 1-10 µA |
| Silicon Current Limiter Aspect Ratio | 20 |
| Gate Aperture | 0.5 µm |
| Tip Diameter | 3 nm |
| Tip Height | 5 µm |

There are several benefits of to using the modular architecture described herein, including increased lifetime, more stable emission current, capability of using vacuum packaging, and ability to separately optimize the key components of the e-beam pumped laser.

A non-limiting example modular electron beam unit can be fabricated based on the structure illustrated in FIG. 9B, including field emitter array electron sources. The example modular electron beam unit can be fabricated as sharp silicon emitter tips surrounded by a proximal extraction gate electrode. The application of a voltage between the extraction gate and the emitter results in a high electrostatic field at the tip of the emitter that can be expressed as a function of the tip radius, $r_{TIP}$, the extraction gate aperture, $r_{AP}$, and the aspect ratio of the silicon nanowire the emitter tip rests on. The example modular electron beam unit includes field emitter elements, each of which is formed as a high aspect ratio silicon current limiter placed in series with each emitter tip, to prevent burn-out that could occur from thermal runaway and also ensure uniformity. The non-limiting example of FIG. 9B also includes thick $SiO_2/Si_3N_4$ gate dielectric stacks between the gate electrode and the emitter substrate. The thick gate dielectric stacks can be used for reliable operation (and to prevent gate leakage), since the field across the dielectric is maintained at a fraction of the critical dielectric breakdown strength ($E_{crit}=10^3$ V/µm). The emitter tip can be coated with a thin Pt layer to improve the resistance of the emitter tips to erosion from back-on bombardment, reduce the sensitivity of the surface to reaction, and promote long term stability.

Using the kinetic formulation of electron emission from conducting surfaces, the emission current from the tip can be expressed as:

$$I_{TIP} = a_{FN} V_{GE}^2 \exp\left[-\frac{b_{FN}}{V_{GE}}\right]$$

$$\text{where } a_{FN} = \frac{\alpha A}{1.1\phi} \exp\left(\frac{10.4}{\sqrt{\phi}}\right), b_{FN} = \frac{0.95 B \phi^{3/2}}{\beta},$$

$$A = 1.5 \times 10^{-6}, B = 6.87 \times 10^7,$$

φ is the workfunction, α is the effective emission area (which depends on the radii of the tips ($r_{TIP}$)), β is the field factor that relates the tip electrostatic field, $F_{TIP}$ to the extraction gate voltage, and $V_{GE}$, such that $F_{TIP}=\beta V_{GE}$. To the first order, the β depends on $r^{TIP}$ through $\beta=k/r_{TIP}^n$, where k is a constant and n≈0.7.

For high current density at relatively modest extraction gate voltage, the field emitter array can be configured to to turn-on at low voltages. For reducing the extraction gate operating voltage, the device dimensions of the field emitter is scaled to smaller values, i.e., reduce the tip radius, $r_{TIP}$, the gate aperture, $r_{AP}$ and silicon nanowire diameter. Scaling to smaller device dimensions increases β and reduces $b_{FN}$, the turn-on voltage, $V_{ON}$ & the operating voltage $V_{OP}$ and increases the current for the same operating $V_{GE}$.

Figures 11A, 11B:
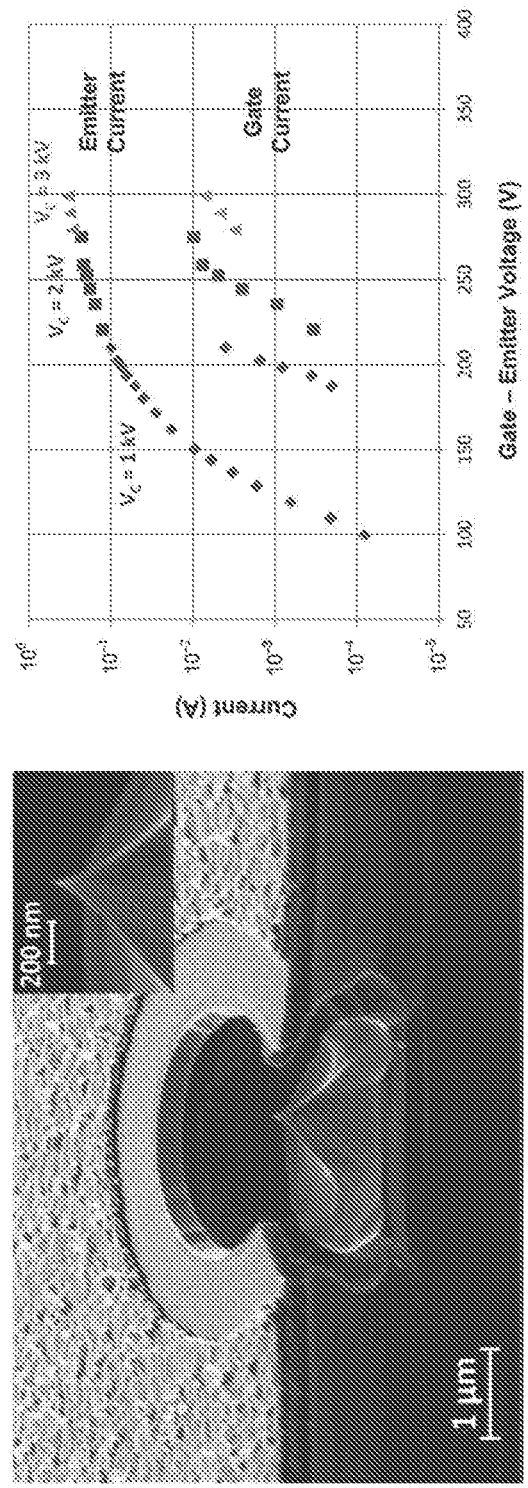
FIG. 11A shows an image of a portion of an example silicon field emitter array, according the principles herein.
FIG. 11B shows a plot of the current-voltage (IV) characteristics of the example device of FIG. 11A, according the principles herein.

FIG. 11A shows an image of a portion of an example silicon field emitter array. The silicon tip is Pt coated, with $r_{TIP}=5$ nm, $r_{AP}=1.5$ mm, and the gate dielectric thickness is about 2.5 µm. FIG. 11B shows a plot of the current-voltage (IV) characteristics of the example device of FIG. 11A, showing a current of about 0.3 A, current density of greater than about 1 A/cm$^2$ and current per tip of about 1.1 µA/tip. FIG. 11B also shows that the gate current is at least two orders of magnitude lower that the emitted current. Table 2 shows example scaling parameters for $r_{TIP}$, $r_{AP}$, and column width for the emitter arrays of different example modular electron beam units.

TABLE 2

| Current Density | Tip Pitch | Tip Density | Aperture Radius, $r_{AP}$ | Tip Radius $r_{TIP}$ | Aspect Ratio |
|---|---|---|---|---|---|
| 1 Acm$^{-2}$ CW 10 Acm$^{-2}$ PWM | 10 μm | 10$^6$ cm$^{-2}$ | 3 μm | 10 nm | 2 |
| 10 A cm$^{-2}$ | 3 μm | 10$^7$ cm$^{-2}$ | 1 μm | 5 nm | 5 |
| 35 A cm$^{-2}$ | 1 μm | 10$^8$ cm$^{-2}$ | 350 nm | 3 nm | 10 |

In other examples, the aspect ratio of the height of the field emitter element to the width can be as high as about 100.

In a non-limiting example modular electron beam unit, a single-gated or double-gated structure can be used to reduce electron beam divergence (to less than about 5°). The electron beam divergence can have an effect on the current density and energy deposition density in the semiconductor gain material of a laser. Example emission angle of a field emitter are ±15°. This may not be adequate for the electron beam pumped laser if the separation between the accelerating electrode (anode) and the emitter is increased to accommodate the breakdown strength of the dielectric spacers. To collimate the beam further, the modular housing unit may include an additional focusing/collimation gate electrode that is vertically stacked above the extraction gate and the tips (such as shown in the non-limiting examples of FIGS. 4, 5, and 10A). According to the principles herein, it is possible to have improved collimation of the electrons emitted from a field emitter array if an additional electrode is added to act as a focus above the plane of the extraction gate electrode. An accelerating electrode (anode) having an open aperture can be positioned above the cathode assembly, but below the membrane window, using a dielectric spacer (such as shown in the non-limiting examples of FIGS. 4, 5, and 10A).

In another example modular electron beam unit, a novel fabrication process can be used to produce small gate apertures (≈350 nm) that are self-aligned to the field emitter tip, which enables device operation at >100 A/cm$^2$ with gate-to-emitter voltages that are less than about 75V. The high current density (J>100 A/cm$^2$) modular electron beam units based on silicon field emitter arrays (FEAs) can be operated at low voltage ($V_{GE}$<60 V), and have long lifetime (T>100 hours @ 100 A/cm$^2$, T>100 hours @ 10 A/cm$^2$, and T>300 hours @ 100 mA/cm$^2$).

An example modular electron beam unit is provided that exhibits improved current density and lifetime, based on arrays of field emitters with a lifetime of 250 hours at a current density of J=100 A/cm$^2$ for small sized arrays and 100 hours at J=100 A/cm$^2$ for medium sized arrays. This can be accomplished by (a) improving the mesa formation process to remove the sharp ridge formed at the perimeter of the mesa that is believed to lead to time dependent dielectric breakdown (TDDB) and degrade the lifetime of the modular electron beam units, (b) depositing a thin noble metal (Ir/Pt) coating on the silicon tips and (c) optimizing the tip etch process to reduce the tip radius dispersion to $\sigma_{rtip}$≈1.00 nm using a tri-level resist process.

An example modular electron beam unit herein includes an electron transparent anode structure, which together with the field emitter array constitute the modular electron beam unit shown in FIG. 9A. The structure fabricated using MEMS technology uses a thin membrane window as the anode 910 that is transparent to electrons but impervious or has low permeability to gas molecules and ions. The membrane anode can be formed as a single monolayer or multiple layers of silicon nitride, amorphous silicon, or other two-dimensional material.

An example modular electron beam unit is provided that exhibits improved current density and lifetime, based on arrays of field emitters with a lifetime of 1,000 hours @ current density of J=100 A/cm$^2$ for small sized arrays, 500 hours @ J=100 A/cm$^2$ for medium sized arrays, 10 hours @ J=250 A/cm$^2$ for small sized arrays, and 100 hours @ J=250 A/cm$^2$ for a single tip. This can be accomplished by (a) increasing the thickness of the insulator under the pad electrode to 3 μm in order to improve TDDB and increase lifetime of the cathodes, (b) optimizing the deposition of a thin noble metal (Ir/Pt) coating on the silicon tips, (c) optimizing the tip etch process to reduce the tip radius dispersion to $\sigma_{rtip}$≈0.75 nm using a tri-level resist process, (e) optimizing the chemical mechanical polishing process for the nitride layer to reduce the tip recess from the top of the gate to <25 nm, (f) optimizing the chemical mechanical polishing process for the poly-silicon gate layer to reduce the gate aperture to ≈300 nm. These steps in the emitter tip and gate electrode fabrication processes can decrease the turn-on voltage $V_{ON}$ and increase the voltage swing. This can lead to an increase in the current density at the same operating voltage, $V_{OP}$.

An example modular electron beam unit is provided that is fabricated using MEMS and wafer bonding technology. The silicon FEA chips can be bonded to silicon backplane using UHV compatible metal bonds. The anode substructure with the electron transparent window can first be bonded to a wafer scale dielectric spacer. The silicon backplane with the FEA chips can be bonded to electron transparent anode with dielectric spacer under UHV conditions. In an example, a getter can be included in the in the example modular electron beam unit packaging.

An example modular electron beam unit is provided that exhibits improved current density and lifetime, based on arrays of field emitters with a lifetime of 10,000 hours @ at a current density J=20 A/cm$^2$, 1000 hours @ J=250 A/cm$^2$ for small sized arrays, and 10 hours @ J=1,000 A/cm$^2$ for a single tip. This can be accomplished by (a) increasing the thickness of the pad insulator to 3.5 μm in order to improve TDDB and increase lifetime of the cathodes, (b) optimizing the tip etch process to reduce the tip radius dispersion to $\sigma_{rtip}$≈0.4 nm using a tri-level resist process, (c) optimizing the chemical mechanical polishing process for the poly-silicon gate layer to reduce the gate aperture to 300 nm. The results of these processes are (1) a decrease in turn-on voltage $V_{ON}$ and (2) an increase in the operating voltage $V_{OP}$, and hence an increase in the voltage swing, current/tip and current density of the example modular electron beam unit. The current/tip can be increased to 10 μA/tip corresponding to current density of J=1000 A/cm$^2$.

Figure 12A:
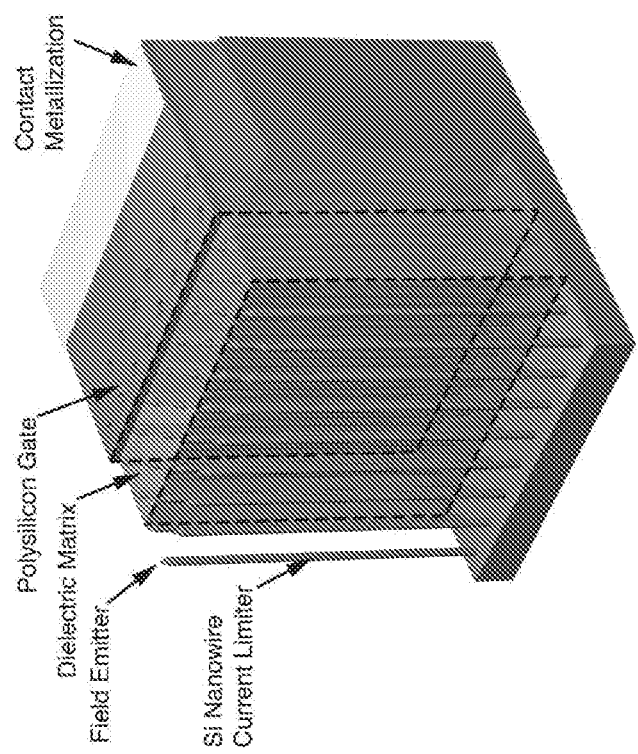
FIG. 12A shows an example field emitter array, according the principles herein.
Figure 12B:
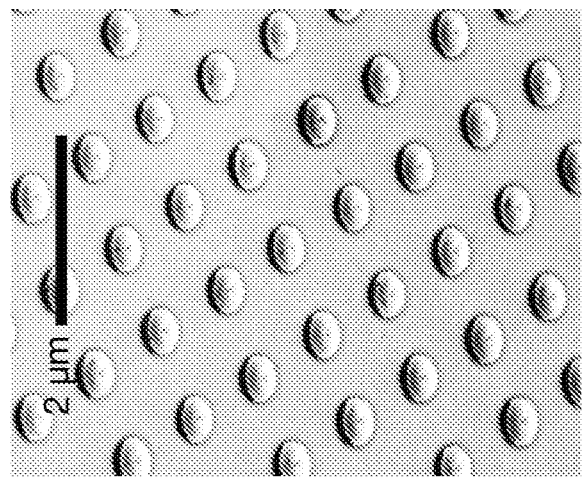
FIG. 12B shows SEMs images of an example field emitter array (FEA), according the principles herein.

An example modular electron beam unit is provided that exhibits a reliable, long lifetime, low voltage, and high current density based on field emission arrays. The field emitter arrays are formed in a unique device architecture that uses a high-aspect-ratio (100:1) silicon nanowire current limiter (diameter=100 nm) to regulate electron flow to each field emitter tip in an FEA. The FEAs have oxidation sharpened silicon tips that can be coated with noble metals such as Pt or Ir and have small gate apertures (less than about 350 nm) in order to consistently obtain field factors β>10$^6$ cm$^{-1}$. This architecture is shown in FIG. 12A. FIG. 12B shows SEMs of devices that can be fabricated. The role of the silicon nanowire current limiter is to prevent catastrophic meltdown of the tip, which could result when (a) some particular tips have radii much smaller than the average or (b) sudden current increase caused by micro-plasma discharge. It also mitigates against burn-out by back streaming ions. In addition, the device structure simultaneously addresses dielectric breakdown as the silicon nanowires are embedded in a dielectric matrix that is 10 μm thick. The thick dielectric between the gate and the substrate significantly reduces the electrostatic field across the insulator stack and hence charge injection. Furthermore, a 2-μm thick $SiO_2$ layer separates the gate contact pad from the substrate allowing gate-to-emitter voltage $V_{GE}$>200 V to be applied before insulator breakdown occurs. An additional benefit of the high aspect ratio nature of the silicon nanowires, is the reduced capacitance per emitter. Finite element simulations of a single emitter indicate capacitance could be less than about 30 aF/emitter.

The example modular electron beam unit architecture can exhibit the following properties: low extraction gate voltage operation ($V_{GE}$<100 V), highly uniform ($2(I_{max}-I_{min})/(I_{max}+I_{min})$<0.1), high current density (J>100 A/cm$^2$ & perhaps 1000 A/cm$^2$), high current (I=10 mA–1 A), and long lifetime ($T_{lifetime}$>10,000 hours @ J=20 A/cm$^2$). The arrays of the example modular electron beam unit can be fabricated using a fabrication process for embedding dense array (10$^8$ cm$^{-2}$) of high aspect ratio silicon nanowires (200 nm diameter & 10 μm tall) in a dielectric matrix and then structure/expose the tips of the nanowires to form self-aligned gate field emitter arrays using chemical mechanical polishing (CMP).

Figure 13A:
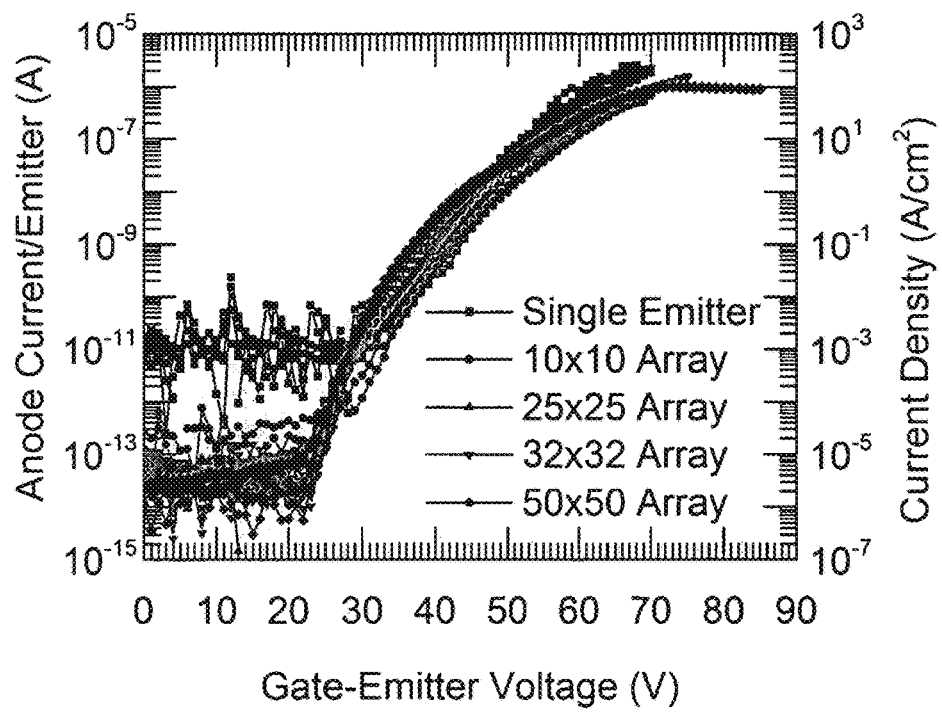
FIG. 13A shows example current-voltage (IV) plots, according the principles herein.
Figure 13B:
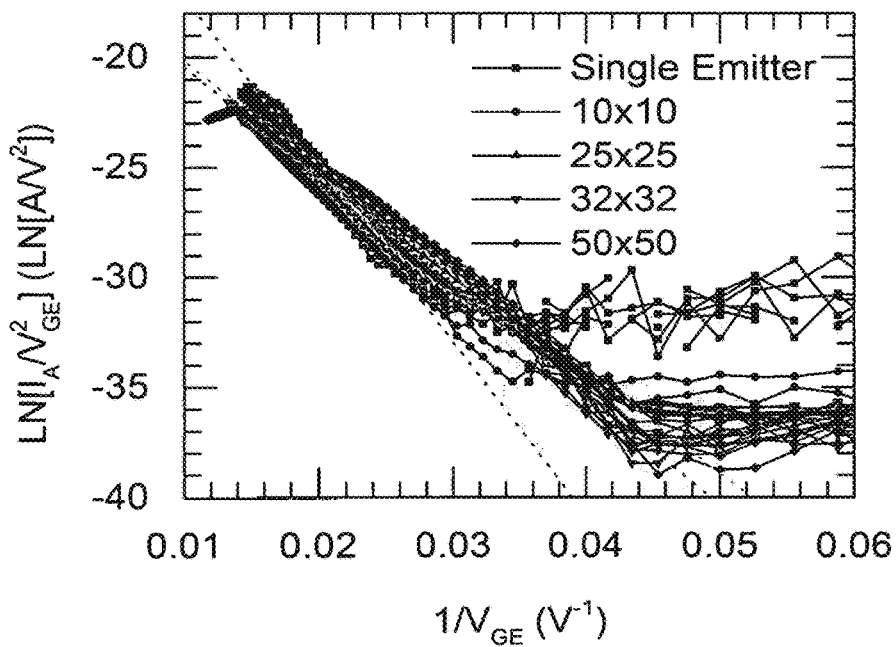
FIG. 13B shows FN plots of different sized FEA devices, according the principles herein.

The example modular electron beam unit exhibits a high current density (J>100 A/cm$^2$) based on silicon field emitter arrays that operates at low voltage ($V_{GE}$<65 V), and has long lifetime ($T_{lifetime}$>100 hours @ 100 A/cm$^2$, 100 hours @ 10 A/cm$^2$, >300 hours @ 100 mA/cm$^2$). The demonstrated current density is an increase of >10× over state-of-the art (~1-10 A/cm$^2$) for field emission cathodes operated in continuous wave (CW) mode. FIG. 13A shows current-voltage (IV) plots and FIG. 13B shows FN plots of different sized devices on the same die that attained a current/tip of 1 μA/tip @ $V_{GE}$≤65 V corresponding to a current density of 100 A/cm$^2$. Table 3 summarizes the data shown in FIG. 13A-13B and provides the slopes ($b_{FN}$) and intercepts (log($a_{FN}$)) of the fit of the data to the Fowler-Nordheim (FN) equation.

may be obtained if the TDDB is modified by increasing the thickness of the insulator stack.

An example modular electron beam unit is provided with FEA that have a tip density of 10$^8$ cm$^{-2}$ (tip-to-tip spacing of 1 μm) with a current of 1 μA/tip corresponding to current density J=100 A/cm$^2$ @ gate-to emitter bias of $V_{GE}$<75 V. The example FEAs have a gate aperture of ≈350 nm and tip radius of ≈5 nm. This results in turn-on voltage ($V_{ON}$) of ≈25 V leading to a voltage swing of ≈40 V and operating voltage ($V_{OP}$) of ≈65 V. With an improved dielectric stack and an optimized mesa formation process, $V_{OP}$≈95 V may be attained, leading to $V_{OP}$-$V_{ON}$ of 70 V and current/tip of 10 μA and current density of J=1000 A cm$^{-2}$. Calculation based on the data for the 32×32 array in Table 3 confirms this current of 10 μA/tip.

An example modular electron beam unit formed with a thick dielectric stack between the gate and the emitter substrate prevents time dependent dielectric breakdown (TDDB), thus improving lifetime. The silicon nanowire current limiter prevents Joule heating and early burn-out of the sharper tips. The very thick dielectric stack reduces the overall capacitance between the gate and the emitter and the small gate aperture reduces the operating voltage and the resulting in much smaller energy stored ($C_{GE}V_{ON}^2$) and hence prevent catastrophic burn-out during discharge between the gate and emitter. The use of an anode that is transparent to electrons and impervious to gas molecules and ions suppresses gas desorption by the anode because the energy deposited on the anode is minimized. The absence of gas molecules in the high vacuum enclosure prevents ionization and tip erosion by back streaming ions.

High current and high voltage applied at the anode can lead to gas desorption by the anode (temperature increase and displacement of adsorbed gasses by energetic electrons). Energetic electrons collide with gas molecules leading to impact ionization and potentially a micro-plasma. The example modular electron beam unit can be formed with a thin membrane anode that is transparent to electrons but impervious to gas molecules or ions and that protects the emitter tips from ions generated outside the high vacuum enclosure. Coating of tip with noble metals, Ir/Pt, can prevent tip erosion. Finally a silicon current limiter con-

TABLE 3

| Array Size | Turn-on Voltage | Maximum Voltage | Maximum Current | Maximum Current/tip | FN Slope | FN Intercept |
| --- | --- | --- | --- | --- | --- | --- |
| Single Emitter | 31 V | 60 V | 2.5 μA | 2.5 μA | 785 | −9.39 |
| 10 × 10 | 27 V | 70 V | 67.8 μA | 678 nA | 610 | −9.33 |
| 25 × 25 | 22 V | 60 V | 11 μA | 176 nA | 445 | −9.87 |
| 32 × 32 | 23 V | 65 V | 1.6 mA | 1.55 μA | 498 | −8.49 |
| 50 × 50 | 22 V | 80 V | 2.6 mA | 1.04 μA | 468 | −7.72 |

Figure 14A:
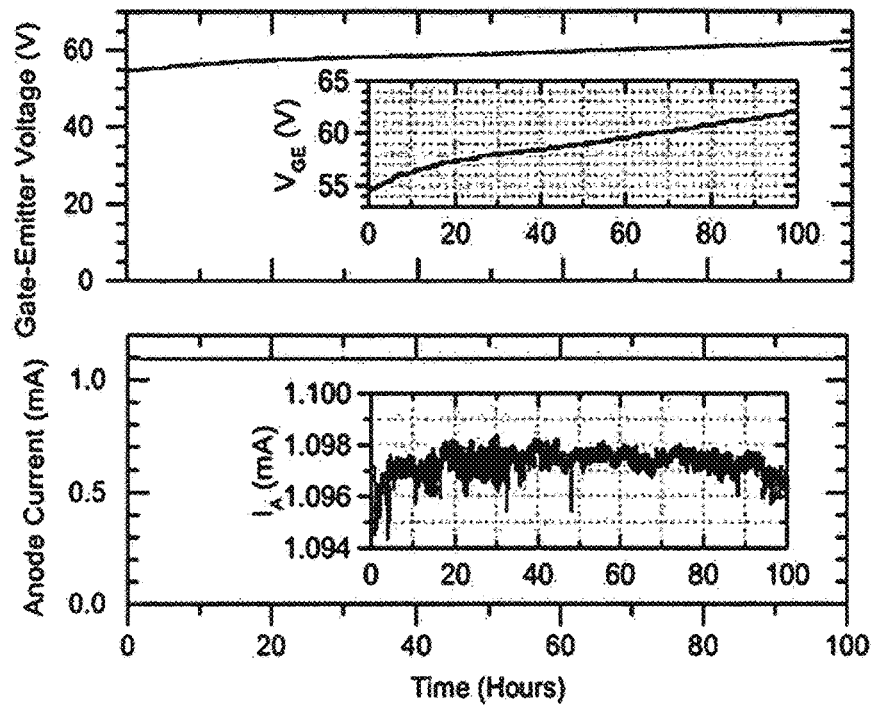
FIGS. 14A-14B show plots summarizing the lifetime data taken on various FEAs, according the principles herein.
Figure 14B:
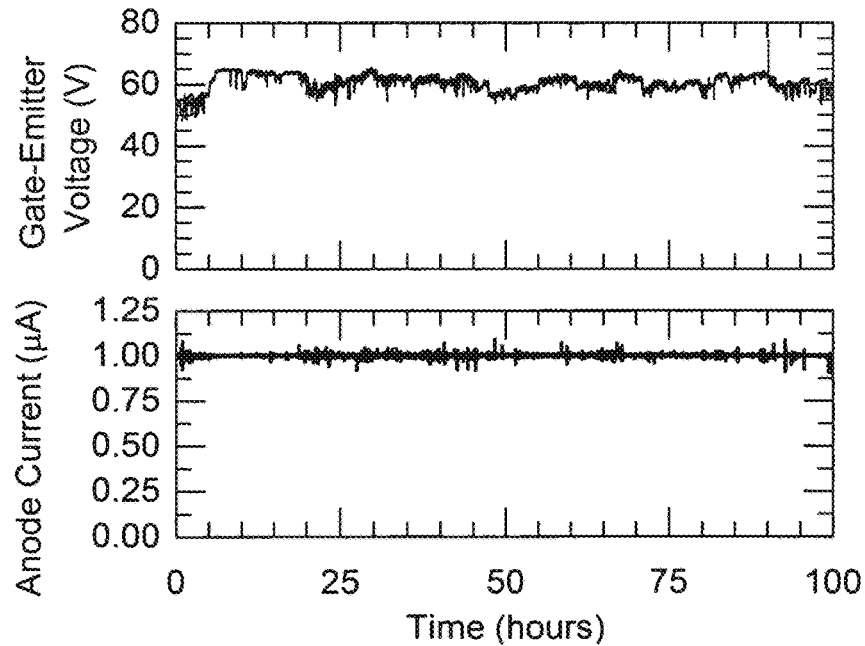

FIGS. 14A-14B show plots summarizing the lifetime data taken on various FEAs at different current densities (for direct current (DC) operation). The improved performance of the FEAs can be attributed to the silicon field emitter array architecture in which the current emitted by each tip is regulated by the silicon nanowire current limiter connected in series with the emitter tip. Using the current voltage characteristics and with the aid of numerical device models, it is estimated the tip radius of the field emission arrays are 4.8 nm, consistent with the tip radius measured using SEM. Using the 32×32 array data in Table 3, a current per tip of ≈10 μA can be attained at $V_{GE}$=93V. An example modular electron beam unit with a current density of 1,000 A/cm$^2$ nected in series with each tip can prevent sudden catastrophic rise in tip temperature from Joule heating and thermal run away.

Figure 15:
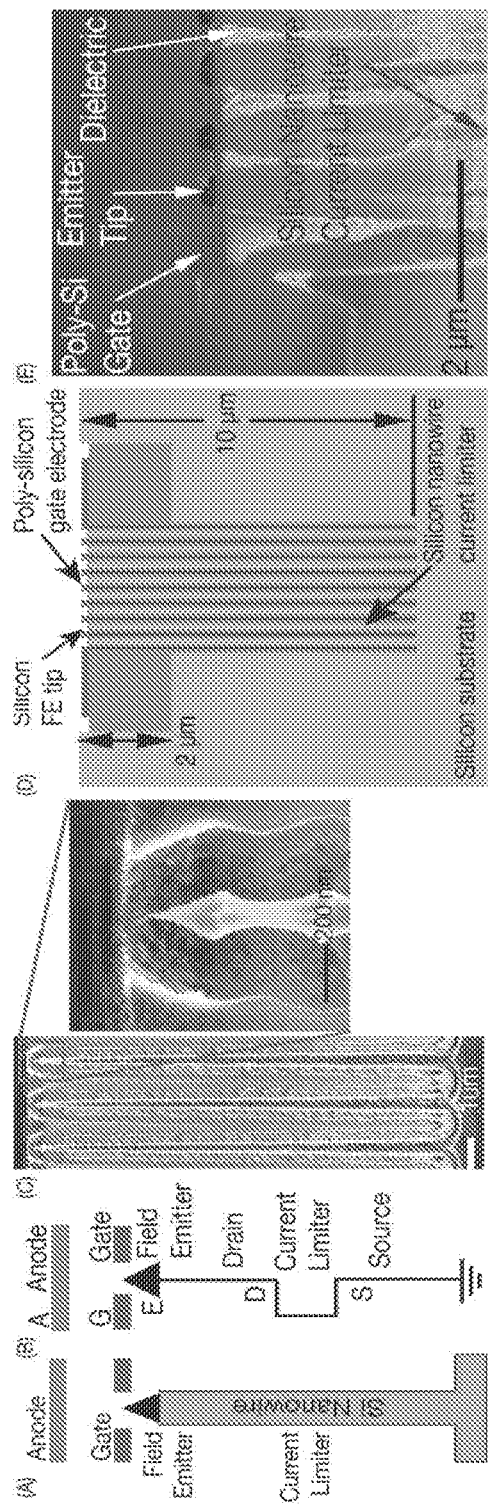
FIGS. 15A-15E show an example schematic diagram (15A), circuit diagram (15B), scanning electron microscope image (15C), schematic cross-section of a completed device structure (15D), and a SEM cross-section of the completed device (15E), according the principles herein

FIG. 15A shows a schematic diagram of a single field emitter element. FIG. 15B shows a circuit diagram of the structure to obtain high current density electron beams. FIG. 15C shows a SEM cross-section of the device with oxide removed to highlight silicon nanowire current limiter. The current limiter is 8-10 μm tall and ≈200 nm in diameter. FIG. 15D shows a schematic cross-section of the completed device structure. FIG. 15E shows a SEM cross-section of the completed device.

Example modular electron beam units herein can be formed by embedding high aspect ratio silicon nanowires in a dielectric matrix to increase the tip density by a factor of more than 100 as compared to existing technology. The operating voltage is reduced by a factor of about 10, allowing the attainment of very high current per tip (>1 µA) and current density of >100 A/cm$^2$ at low operating gate-to-emitter voltages ($V_{GE}$<75 V) while also attaining long lifetimes (>100 hours @ 100 A/cm$^2$). The presence of a current limiter in the emitter circuit improves both emission current uniformity and lifetime/reliability. Current uniformity is improved because the electrons emitted from sharper tips which turn-on at lower voltages (from a higher field factor, β) are regulated by the current limiter, while the duller tips that turn-on at higher voltages emit lower currents.

Figure 16:
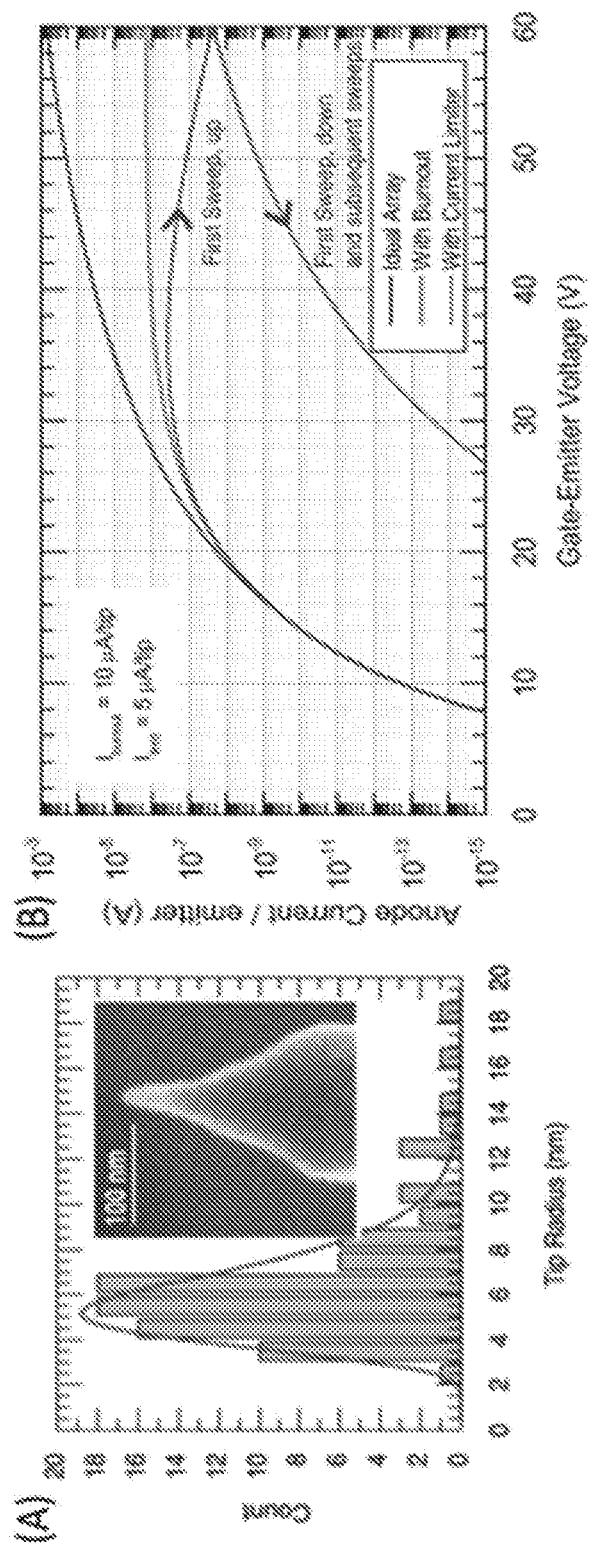
FIG. 16A shows a plot of the radii of example silicon emitter tips, according the principles herein.
FIG. 16B shows an example simulation of anode current/emitter using the radii distribution of FIG. 16A, according the principles herein.

FIG. 16A shows the radii of 200 silicon tips measured using an SEM with an SEM of a single tip as an inset. The tip radii have log-normal distribution with an average of about 5 nm and standard deviation of 1.5 nm. FIG. 16B shows simulation of anode current/emitter using the same distribution. Burn-out of sharper tips can occur when the emission current reaches 10 µA. The lower curve shows that anode current deceases between the up and down sweeps due to tip burn-out. When the current/emitter is regulated to 5 µA by a current limiter, the sharper tips do not burn-out.

Figure 17:
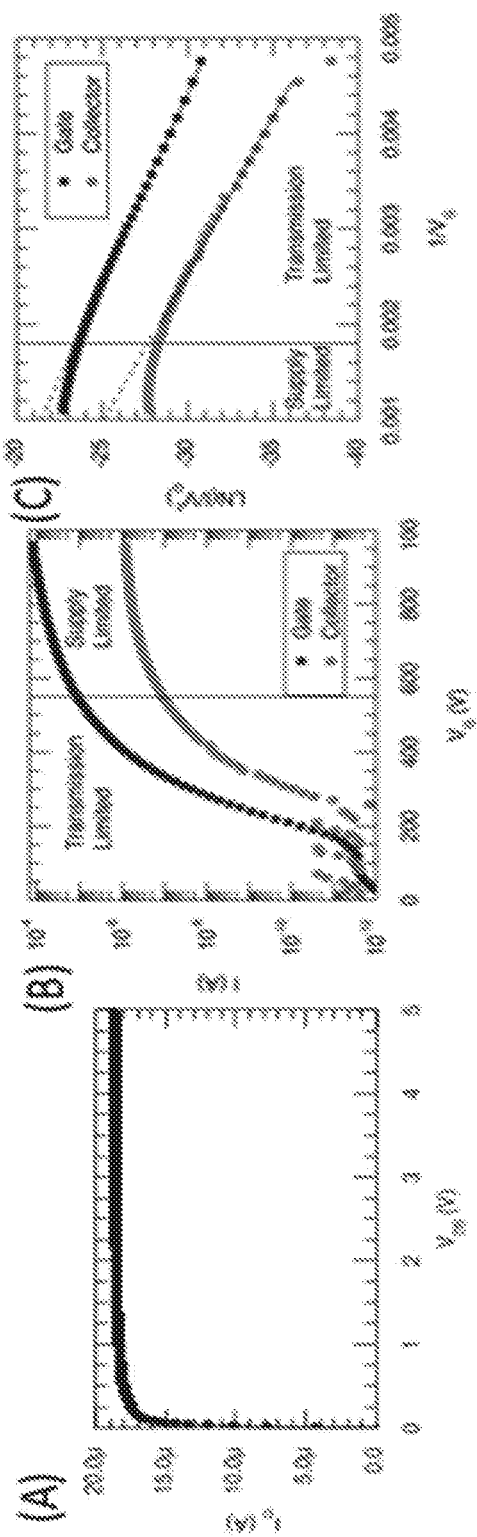
FIGS. 17A-17B show the current-voltage (IV) characteristics of an array of silicon nanowire current limiters, according the principles herein.
Figure 18:
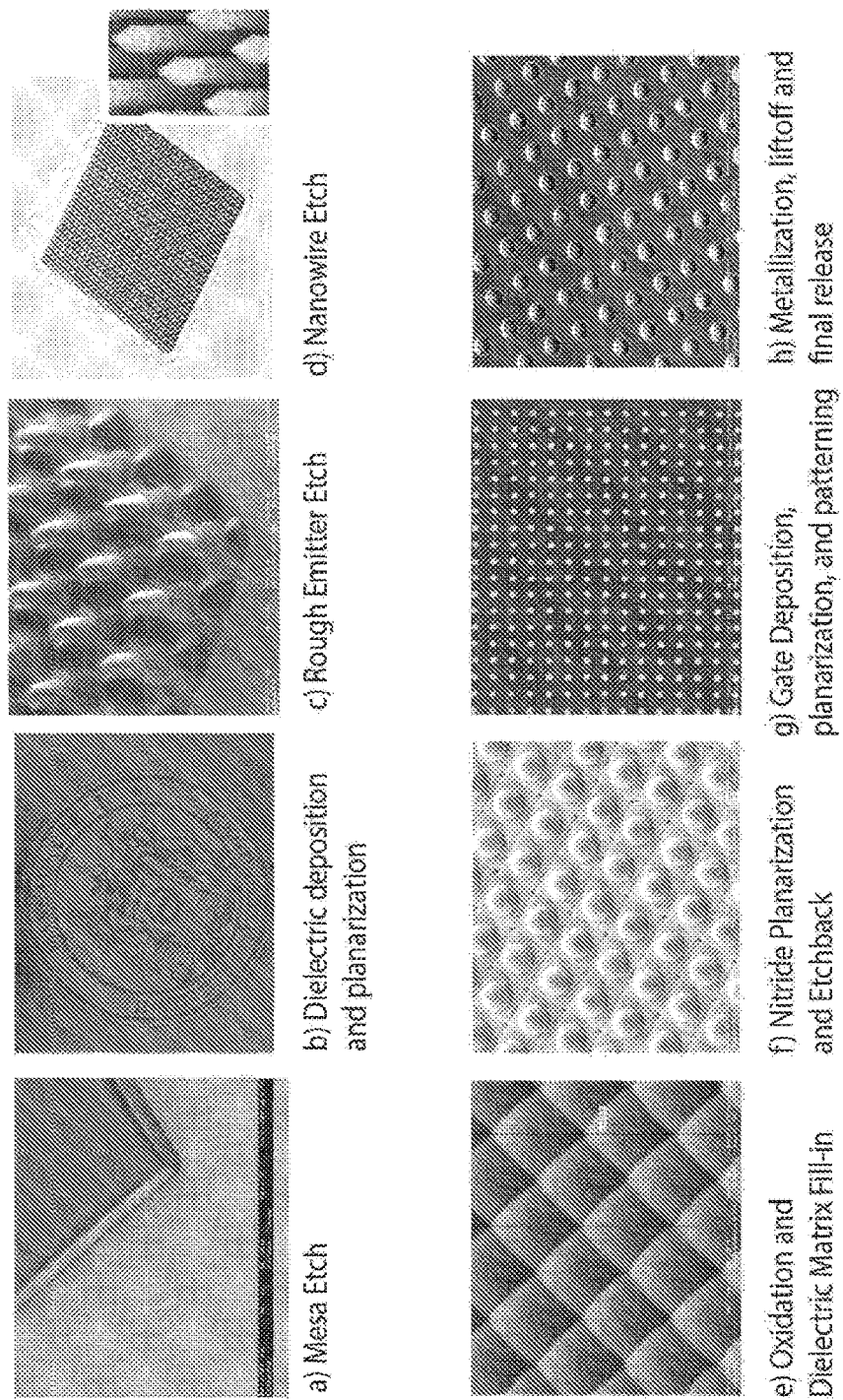
FIGS. 18A-18H show results of stages in the process of fabrication of the silicon FEAs, according the principles herein.
Figure 19:
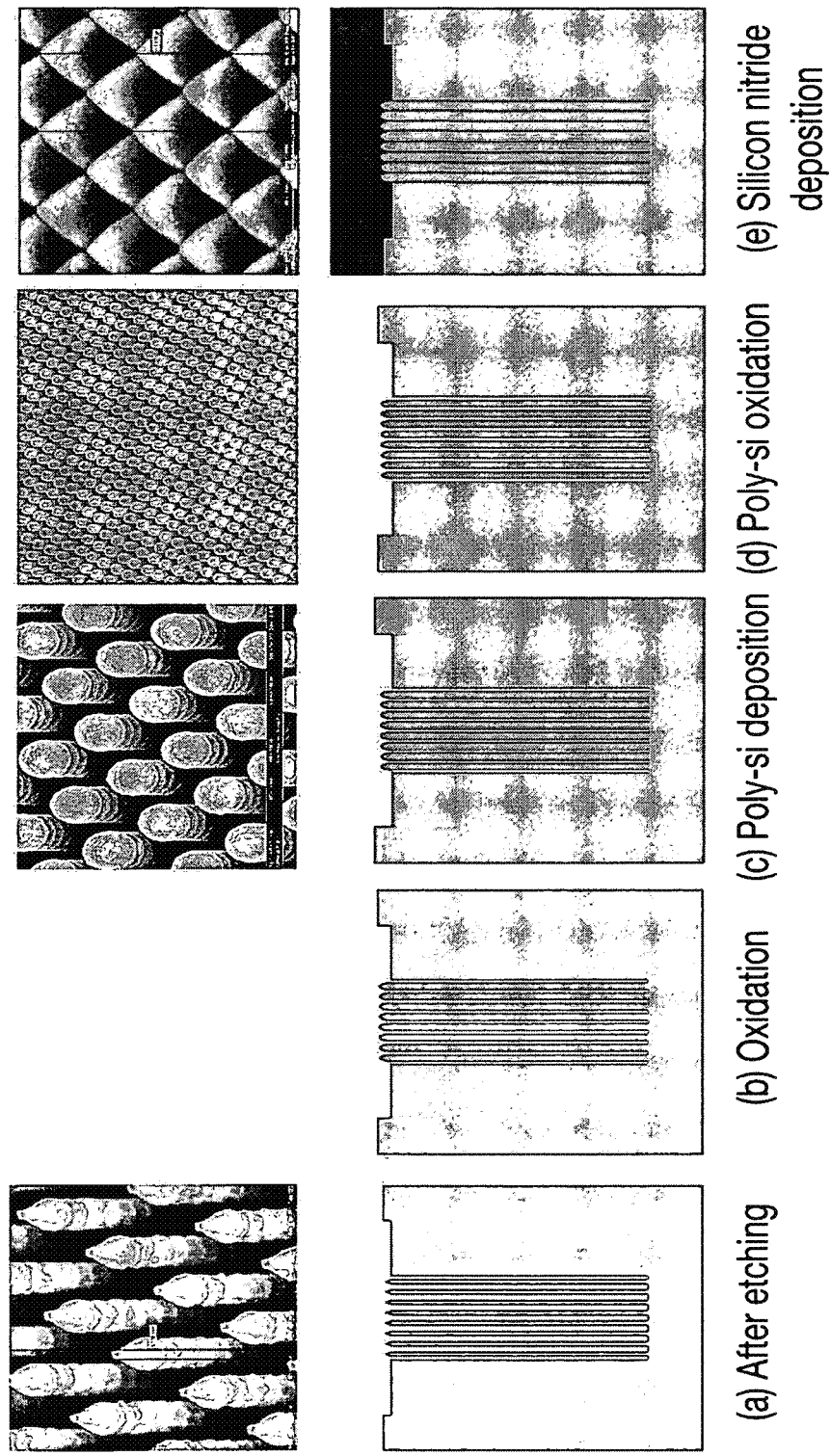
FIGS. 19A-19E show results of an example process for filling in the voids between adjacent silicon nanowires, according the principles herein.

FIGS. 17A-17B show the current-voltage (IV) characteristics of an array of silicon nanowire current limiters, showing current source like behavior. FIG. 17C shows the current-voltage (I-V) and Fowler-Nordheim (F-N) characteristics for an array of field emitters individually regulated by silicon nanowire current limiters. At gate voltages over 550 V, the FET-FEA enters a regime where the current is limited by the supply of electrons to the field emitters, rather than the transmission through the barrier.

As shown in FIGS. 17A-17C, reliability can be improved because no tip ever attains a current level that is sufficient to lead to thermal runaway and melting because of the silicon nanowire current limiters. The current limiters also help to prevent cathodic arcs or plasma formation. Lifetime is improved because the electrostatic field across the insulator is significantly reduced leading to reduction in time dependent dielectric breakdown (TDDB).

As a non-limiting example, modular electron beam units formed from dense arrays of silicon nanowires embedded in a dielectric matrix are exciting structures with a potentially broad range of applications that include electronics and optoelectronic devices.

FIG. 12A shows a 3-D rendering of an example device structure of a 2-D array embedded in a dielectric matrix. For clarity, layers have been omitted in different regions of the rendering to show detail. In the front, the bare silicon nanowires (200 nm diameter & 10 µm height) with sharp tips are shown. In the middle, the nanowires are shown embedded in a dielectric matrix. The complete device structure is shown in the back with annular polysilicon gate apertures (350 nm diameter). FIG. 12B shows a scanning electron microscope (SEM) image of the completed device at 45° tilt.

A non-limiting example fabrication process of arrays of silicon field emitters with vertical silicon nanowire current limiters and self-aligned gates is described.

FIGS. 18A-18H show results of stages in the process of fabrication of the silicon FEAs with vertical nanowire current limiters.

As shown in FIG. 18A, a mesa region, on which the array of silicon nanowires capped with field emitter tips later can be fabricated, is defined by etching trenches around the intended array region. In an example, the trench is at least 200 µm-wide and 2 µm-deep. A 5-µm of plasma enhanced chemical vapour deposited (PECVD) oxide is deposited on both the front and the back of the wafer to fill in the trenches that were formed with dielectric. In order to manage stress and prevent bowing, the deposition is carried out in two steps, with an anneal step in between. Between depositions and after the second deposition, the wafers are annealed at 900° C. in N$_2$ ambient.

As shown in FIG. 18B, a chemical mechanical polishing (CMP) is used to planarize the surface and expose the bare silicon in the mesa region. A corresponding amount of the oxide film on the backside of the wafer is removed to balance the stress in the oxide films and remove the wafer bow that results after CMP. After planarization, approximately 2-µm of SiO$_2$ remains in the trenches around the active regions, and it isolates the gate electrode pad from the substrate and prevents dielectric breakdown of the oxide during normal device operation.

A 50-nm of dry thermal oxide is grown followed by the deposition of 250-nm of SiO$_2$ by PECVD. The oxide layers are an etch mask for patterning the emitters. The process to fabricate the nanoscale-sharp silicon tip and the silicon nanowire current limiter begins with an i-line stepper photolithography using a positive photoresist (Shipley SPR-700) to form 1-µm pitch arrays of 0.5 µm photoresist dots. The array patterns are well-aligned (misalignment <50 nm) to the mesa regions. The oxide hard mask is patterned by CF$_4$/CHF$_3$/Ar reactive ion etching. After this etch, the tip has a diameter of about 200 nm. An SF$_6$ plasma is used to etch the silicon isotropically. The result of this etch, shown in FIG. 18C, forms what can become the field emitter tips. Next, deep reactive ion etching (DRIE) is used to form the high-aspect-ratio silicon pillars. The pillars after the DRIE step with the SiO$_2$ hard mask removed is shown in FIG. 18D. At this point, the pillars have a diameter of 400 nm, and are 10 microns tall. The diameter is somewhat less than the diameter of the hardmask used due to undercutting of the oxide during the DRIE step due to some anisotropy of the etch.

The remaining photoresist and the hard mask are stripped in an O$_2$ plasma and 7:1 BHF, respectively. To reduce the dimensions of both the pillar and the tip to their final dimensions, the wafers underwent wet oxidation at 950° C. The 950° C. is the temperature above which viscoelastic flow of silicon dioxide occurs, which would deform the shape of the silicon dioxide and potentially result in blunt silicon tips. A 2-D finite element semiconductor process simulator (Silvaco ATHENA) is used to design the etching and oxidation steps to ensure that the emitter tip are nanoscale-sharp and that the silicon nanowire are <200 nm in diameter after this oxidation. The silicon nanowire has a diameter of ≈200 nm and the column height is ≈8-10 µm. The silicon tip is formed by oxidation sharpening resulting in a tip radius of ≈6-8 nm.

FIGS. 19A-19E show results of an example process for filling in the voids between adjacent silicon nanowires with a dielectric matrix. After the formation of the tip, the space between the silicon nanowires/tips is filled-in with a dielectric stack through the multi-step process shown in FIGS. 19A-19E. This stack includes silicon dioxide and silicon nitride formed through a combination of deposition of undoped polysilicon films and oxidation of the polysilicon films, and silicon nitride deposition. The undoped polysilicon is deposited at 625° C. using low-pressure chemical vapour deposition (LPCVD). At this temperature, the polysilicon has columnar growth and large grains. In addition, due to the elevated temperature at which the deposition takes place, the deposition is reaction-limited and the polysilicon has high surface mobility, allowing for conformal deposition into the deep voids between nanowires. The thickness of deposited film is controlled so that after subsequent oxidation, a gap of <50 nm remains between adjacent nanowires, and thus prevent the oxidizing surfaces from meeting. If the oxidation fronts do meet, they form keyhole voids or leave unoxidized polysilicon.

The remaining void is filled by 1-μm of low-stress, silicon-rich silicon nitride ($SiN_x$) deposited in a vertical tube reactor via LPCVD at 800° C. The deposition reaction to form $SiN_x$ is also rate-limited and has high surface diffusion so that the nitride fills in the remaining gaps between pillars, as shown in FIG. 18E. Subsequent cross-section shows that this process creates a reproducible, consistently void-free dielectric matrix that completely surrounds the nanowires.

After the deposition of the dielectric stack, a self-aligned polysilicon gate is defined. A timed etch of the nitride is performed using CMP to bring the surface of the nitride to within approximately 100 nm of the top of the oxide domes.

Figure 20:
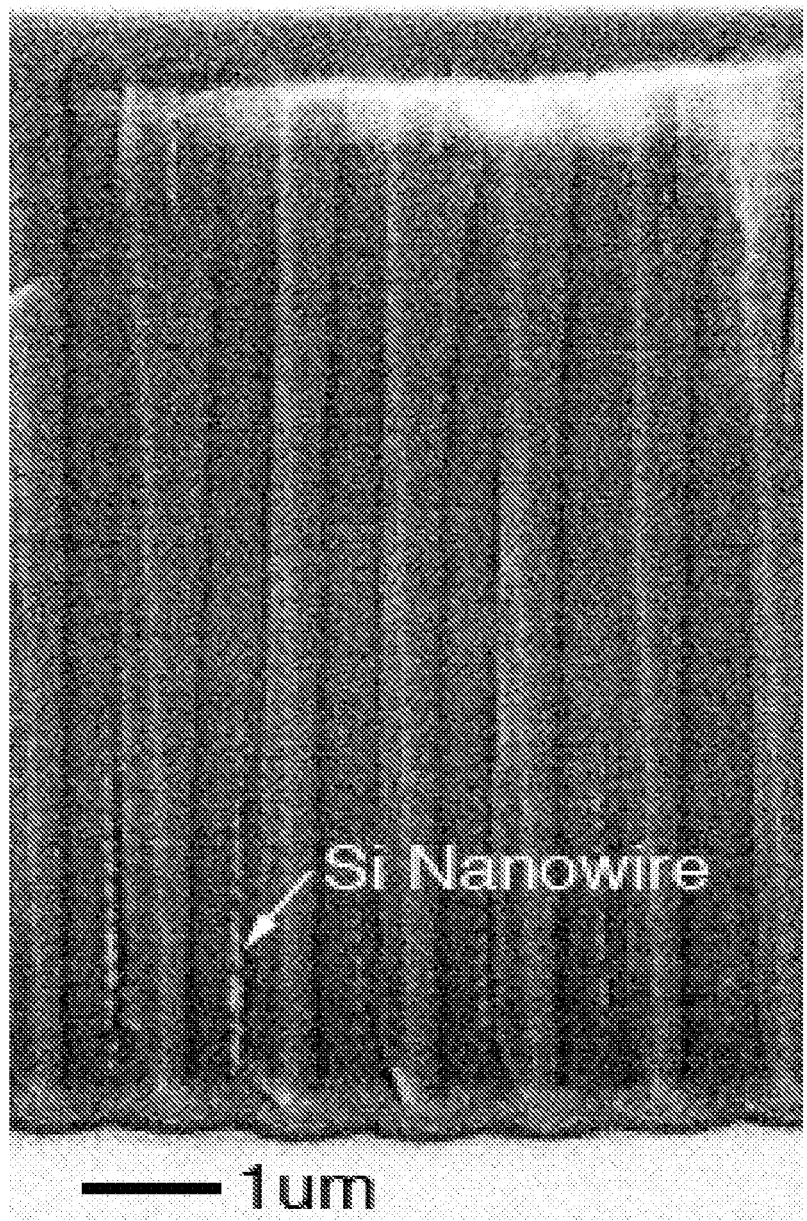
FIG. 20 shows a cross-section of the void free fill after planarization, according the principles herein.

FIG. 20 shows a cross-section of the void free fill after planarization, showing the void-free dielectric matrix with vertical silicon nanowires embedded in them after CMP Planarization. The oxide domes can assist in the formation of the gate apertures. The oxide domes are exposed as shown in FIG. 18F through a timed wet etch using phosphoric acid at 160° C. (etch rate ~40 Å/min). Phosphoric acid etches silicon nitride with a selectivity of ~20:1 relative to silicon dioxide. An 800 nm of polysilicon gate electrode material that is in situ doped with phosphorus is next deposited. The dopants are activated using rapid thermal annealing (RTA) at 950° C. for 30 s. A third CMP step planarizes the gate, and is timed to stop within 50 nm of the emitter tip. The grown and deposited oxide around the emitter tip defines the gate aperture, and the depth of the silicon nitride wet etch determines the gate thickness. FIG. 18G shows the gate apertures after CMP.

After gate apertures are formed, the poly silicon gate is patterned through photolithography and a dry etch process. Ni/Ti/Au contact metal is deposited and patterned using a lift-off technique. The metal stack is sintered at 400° C. under forming gas for 30 minutes. During the sintering process, the nickel reacts with the polysilicon to form a nickel silicide, ensuring low contact resistance. Finally, a commercial pad etchant (Silox Vapox III, Transene Co., Danvers, Mass.) removes the oxide encasing the tips to expose the tips. The sample is dried with $N_2$ and loaded into ultra-high-vacuum for current-voltage (I-V) characterization. A tilted SEM image of the completed and released device is shown in FIG. 18H.

Figure 21A:
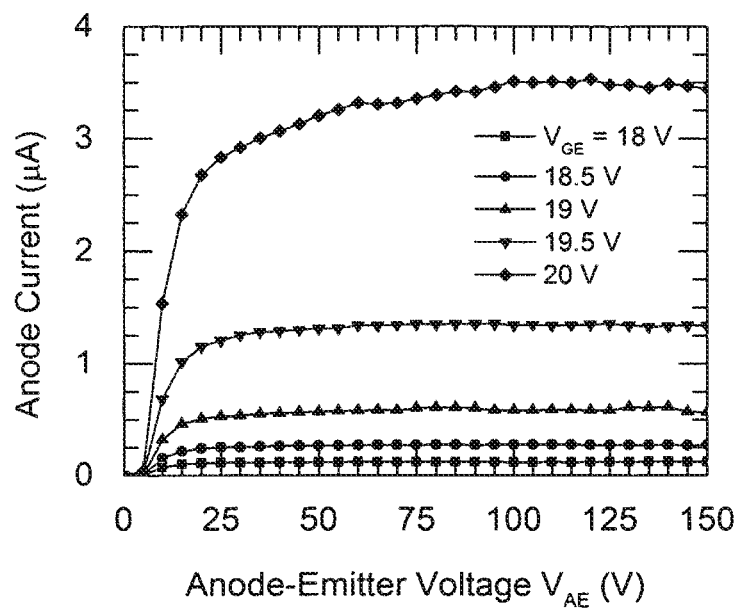
FIGS. 21A-21B show plots of example anode current-voltage characteristics, according the principles herein.
Figure 21B:
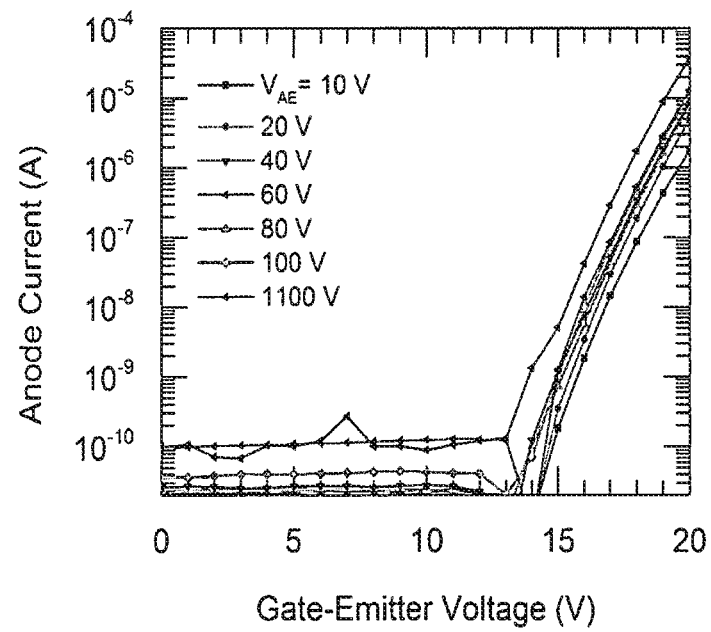

FIGS. 21A-21B show the output characteristics (FIG. 21A) and the transfer characteristic (FIG. 21B) for a 500× 500 array (250,000 emitter tips). The example device turns ON at a gate-emitter voltage of approximately $V_{GE,ON}$=14 V, and reaches >3 μA of current (>16 pA/emitter) at $V_{GE}$<20 V. As expected, for gate voltages >$V_{GE,ON}$ the anode voltage has very little dependence on anode voltage. This low turn-on voltage can be attributed to the log-normal statistical variation of tip radius of emitter tips, that arises from the fabrication process implemented to make the nanometer-sharp silicon emitters. Because of the distribution of tip radius, at low voltages, the several very sharp (radius ~1 nm) emitters dominate the current characteristics. After prolonged emission or emission at higher voltages, the turn-on voltage shifts to higher voltages, perhaps due to blunting of the emitter tips or charging of the insulating oxide. At $V_{GE}$=20 V, the gate transconductance reaches about 30 μS (0.12 nS/tip). The transconductance shown is limited by the extremely low operating voltage of this cathode. Extension to higher voltages and currents could yield similar results, since the transconductance for a cathode scales exponentially with gate voltage, and the currents are for $V_{GE}$>60 V.

An example analytical model relating the field factor, β, to the emitter tip radius is the ball-in-sphere model. In the ball in sphere model, the emitter tip is modelled as a hard, metal sphere of radius r in a large, spherical shell of radius R. The relationship of the voltage on the sphere to the electric field at the surface of the sphere is simply given by the solution of Laplace's equation in spherical coordinates.

$$\beta = \frac{1}{r} - \frac{1}{R-r} \approx \frac{1}{r} \Big| r \ll R$$

Figure 22:
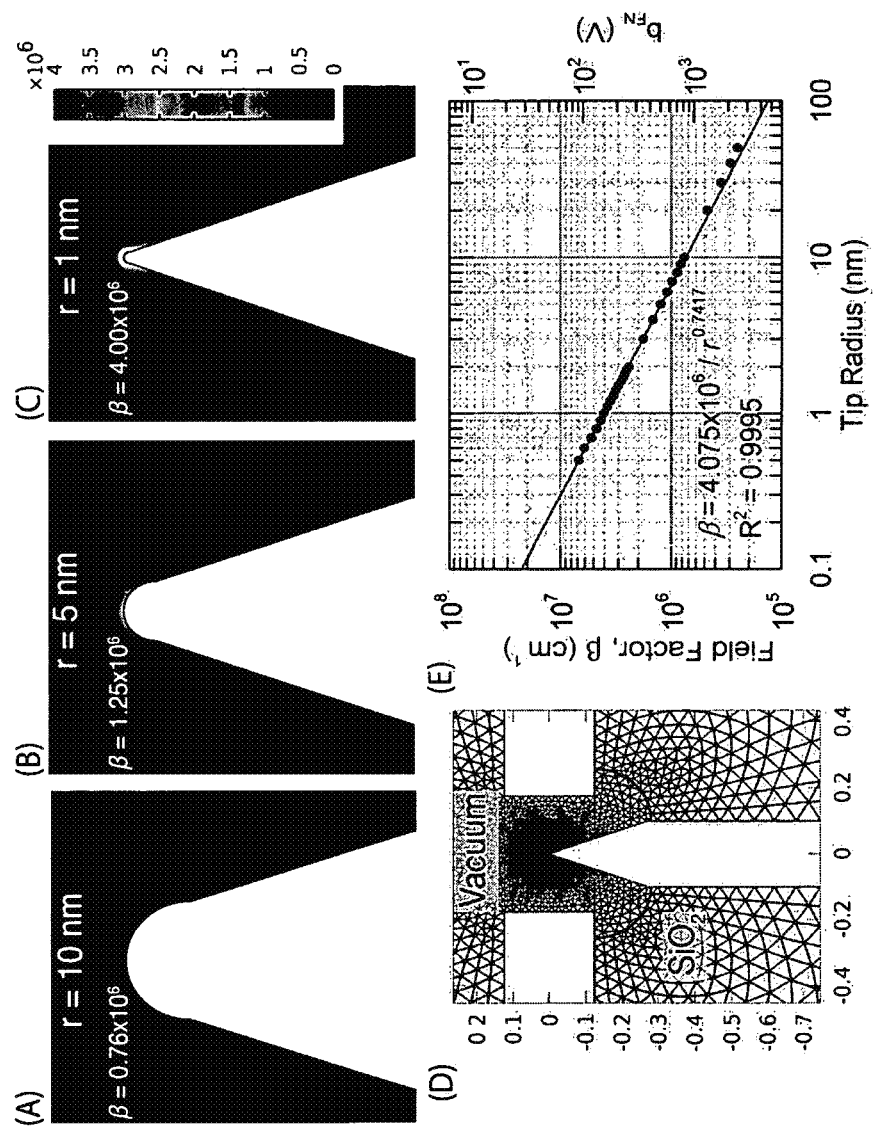
FIGS. 22A-22E show finite element electrostatics simulations, according the principles herein.

FIGS. 22A-22E show finite element electrostatics simulations to determine the relationship between tip radius (r) and field factor (β) for the silicon nanowire with self-aligned gated tip. The nanowire is 200 nm in diameter and 10 microns tall, with a tip half-cone angle of 30 degrees. FIGS. 22A-22C show detail of the electric field around the apex of the tip for tip radii of 10 nm (22A), 5 nm (22B), and 1 nm (22C). FIG. 22D show device structure materials and mesh for the electrostatic simulation showing different regions. FIG. 22E shows a fit of field factors with the model $\beta=k/r^n$.

The finite element simulation of the tip geometry, shown in FIGS. 22A-22C, plots the electric field proximal to tips of various emitter radii.

Figure 23:
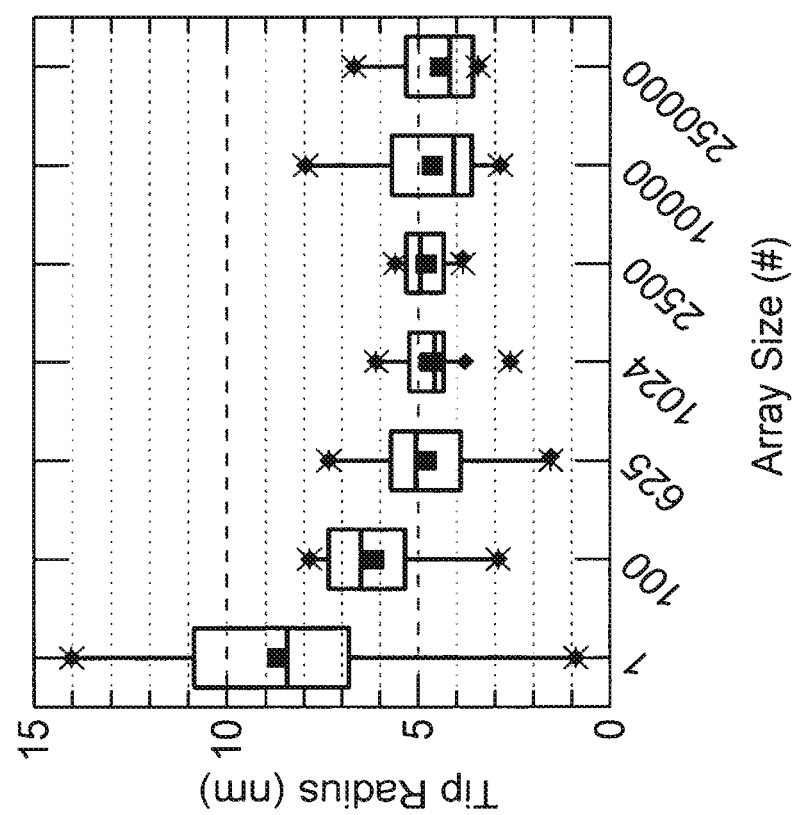
FIG. 23 shows a box chart of the distribution of average effective tip radii, according the principles herein.

FIG. 23 shows a box chart of the distribution of average effective tip radii extracted from I-V characteristics and fitted to tip radius using the extrapolation from the finite element model. The square in the center of each box indicates the mean value of tip radius of the distribution. The horizontal line inside of each box is the median value of tip radius. The upper and lower bounds of the box show the first (Q1) and third quartiles ($Q_3$) of the tip radius distribution, the height of the box is the inter-quartile range (IQR). The starred points are outliers.

Figure 24:
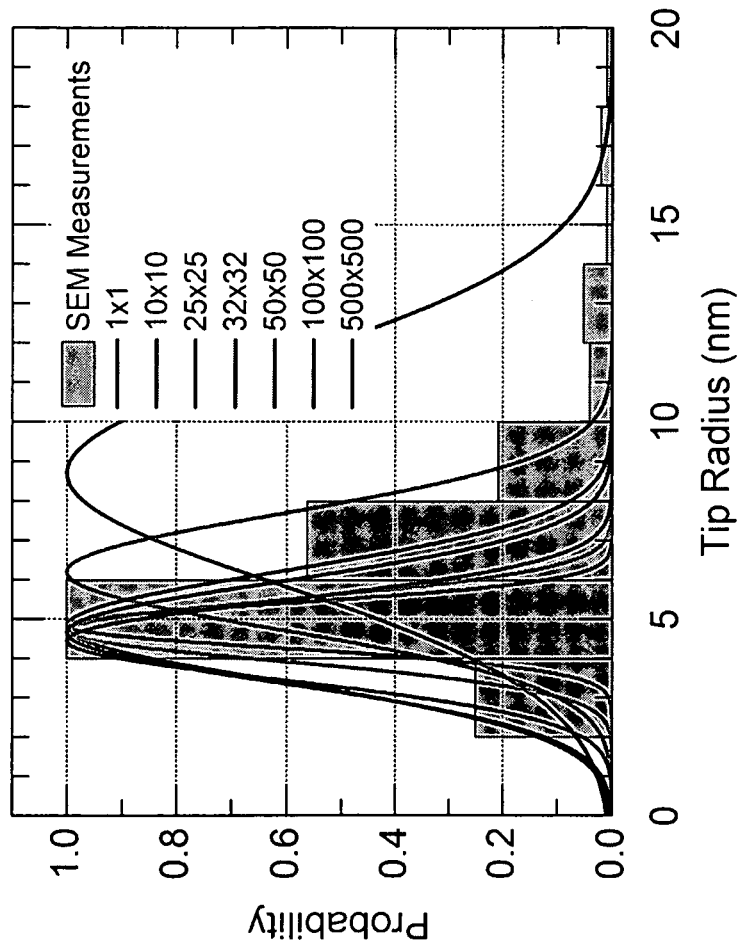
FIG. 24 shows plots of example probability density functions of the average effective tip radii of different array sizes, according the principles herein.

FIG. 24 shows the probability density functions of the average effective tip radii of different array sizes, superimposed on a histogram of 200 tip radii measured on a representative sample.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention may be implemented in any of numerous ways, including through implementations provided in FIGS. 1 to 24 attached hereto. For example, some embodiments may be implemented using hardware, software or a combination thereof. When any aspect of an embodiment is implemented at least in part in software, the software code may be executed on any suitable processor or collection of processors, whether provided in a single device or computer or distributed among multiple devices/computers.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A modular electron beam unit comprising:
an electron beam source comprising:
a base portion;
at least one field emitter element coupled to the base portion, comprising:
a first end that is proximate to the base portion;
a field emitter tip disposed proximate to a second end that is opposite to the first end;
an ungated transistor channel formed between the first and the second end of the at least one emitter element; and
at least one gate electrode disposed proximate to the second end of the at least one field emitter element, to apply a potential difference proximate to the field emitter tip of the at least one field emitter elements, thereby extracting electrons from the at least one field emitter tip to form an electron beam; and
a membrane window disposed over the at least one gate electrode, the membrane window being formed of a material that is selectively transmissive to electrons but impermeable to gas molecules, and the membrane window being coupled to the at least one gate electrode such that the modular electron beam unit has low permeability to oxidizing gaseous molecules.

2. The modular electron beam unit of claim 1, wherein at least a portion of the membrane window is in physical communication with the at least one gate electrode.

3. The modular electron beam unit of claim 1, further comprising an electrically insulating or poorly conductive stand-off enclosure disposed between and spacing apart at least a portion of the membrane window from the at least one gate electrode.

4. The modular electron beam unit of claim 3, wherein the membrane window is configured to serve as an anode.

5. The modular electron beam unit of claim 3, wherein the membrane window comprises graphene.

6. The modular electron beam unit of claim 1, wherein the membrane window is coupled to the at least one gate electrode such that the modular electron beam unit is hermetically sealed.

7. The modular electron beam unit of claim 1, wherein the at least one field emitter element comprises a donor-doped region or an acceptor-doped region disposed at the second end.

8. The modular electron beam unit of claim 1, wherein the membrane window is formed from a two-dimensional material.

9. The modular electron beam unit of claim 8, wherein the membrane window comprises one or more of molybdenum disulphide, a nitride material, an oxide material, silicone, or any combination thereof.

10. The modular electron beam unit of claim 1, wherein the base portion comprises at least one logic chip, and wherein the at least one field emitter element is in electrical communication with the at least one logic chip.

11. A modular electron beam unit comprising:
a modular housing unit that is selectively impermeable to gas molecules including oxidizing gaseous molecules, the modular housing unit comprising:
a base portion;
a membrane window that is selectively transmissive to electrons and impermeable to gas molecules;
an electron beam source disposed in the modular housing unit, the electron beam source comprising:
at least one field emitter element disposed over the base portion, comprising:
a first end that is proximate to the base portion;
a field emitter tip disposed proximate to a second end that is opposite to the first end;
an ungated transistor formed at least partially in a semiconductor nanowire; and
at least one gate electrode disposed proximate to the second end of the at least one field emitter element, to apply a potential difference proximate to the field emitter tip of the at least one field emitter elements, thereby extracting electrons from the at least one field emitter tip to form an electron beam; and
at least one anode component disposed in the modular housing unit and configured to accelerate the electron beam in a path directed at the membrane window of the modular housing unit.

12. The modular electron beam unit of claim 11, wherein the membrane window is formed of a material that forms a hermetic seal with the modular housing unit.

13. The modular electron beam unit of claim 11, wherein at least a portion of the modular housing unit is at a vacuum and/or comprises an inert gas.

14. The modular electron beam unit of claim 11, wherein the region between the membrane window and the field emitter tip is at pressure in a range from about 1.0 milliTorr to about $1 \times 10^{-9}$ Torr.

15. The modular electron beam unit of claim 11, wherein the membrane window comprises one or more of graphene, molybdenum disulphide, a nitride material, an oxide material, silicone, or any combination thereof.

16. The modular electron beam unit of claim 11, wherein the base portion comprises at least one logic chip, and wherein the at least one field emitter element is in electrical communication with the at least one logic chip.

17. A modular electron beam unit comprising:
a modular housing unit that is selectively impermeable to gas molecules including oxidizing gaseous molecules, the modular housing unit comprising:
a base portion; and
a membrane window made of a two-dimensional material that is selectively transmissive to electrons and impermeable to gas molecules; and
an electron beam source disposed in the modular housing unit, the electron beam source comprising:
a plurality of field emitter elements disposed over the base portion in at least one array, each field emitter element of the plurality of field emitter elements comprising:
a first end that is proximate to the base portion; and
a field emitter tip disposed proximate to a second end that is opposite to the first end; and
at least one gate electrode disposed proximate to the plurality of field emitter elements, to apply a potential difference proximate to at least one field emitter tip of the plurality of field emitter elements, thereby extracting electrons from the at least one field emitter tip in a direction away from the at least one field emitter tip; and
at least one electrostatic electrode configured to direct the electrons in an emission path that crosses at least a portion of the membrane window of the modular housing unit, thereby forming an electron beam.

18. The modular electron beam unit of claim 17, wherein each field emitter element comprises a current channel region disposed at the first end.

19. The modular electron beam unit of claim 17, wherein the at least one electrostatic electrode comprises at least one of: an electron focusing lens assembly, an additional gate electrode, an Einzel lens, an acceleration grid, and a stigmation corrector.

20. The modular electron beam unit of claim 17, wherein the membrane window forms a hermetic seal with the modular housing unit.

* * * * *

UNITED STATES PATENT AND TRADEMARK OFFICE
CERTIFICATE OF CORRECTION

PATENT NO. : 10,319,554 B2
APPLICATION NO. : 15/539384
DATED : June 11, 2019
INVENTOR(S) : Akintunde I. Akinwande et al.

Page 1 of 1

It is certified that error appears in the above-identified patent and that said Letters Patent is hereby corrected as shown below:

In the Claims

In Claim 9, at Column 29, Line 16, delete the word "silicone" and replace it with -- silicene --

In Claim 15, at Column 30, Line 8, delete the word "silicone" and replace it with -- silicene --

Signed and Sealed this
Third Day of September, 2019

Andrei Iancu
*Director of the United States Patent and Trademark Office*